(12) United States Patent
Ohshima et al.

(10) Patent No.: US 12,588,604 B2
(45) Date of Patent: Mar. 31, 2026

(54) PLANT CULTIVATION DEVICE AND PLANT CULTIVATION METHOD

(71) Applicant: PLANTX CORP., Tokyo (JP)

(72) Inventors: Kazutaka Ohshima, Tokyo (JP);
Shinjiro Yamada, Tokyo (JP); Takuji Akiyama, Tokyo (JP); Shunsuke Sakaguchi, Tokyo (JP); Kosuke Yamada, Tokyo (JP)

(73) Assignee: PLANTX CORP., Tokyo (JP)

( * ) Notice: Subject to any disclaimer, the term of this patent is extended or adjusted under 35 U.S.C. 154(b) by 121 days.

(21) Appl. No.: 17/918,283

(22) PCT Filed: Apr. 9, 2021

(86) PCT No.: PCT/JP2021/015081
§ 371 (c)(1),
(2) Date: Mar. 22, 2023

(87) PCT Pub. No.: WO2021/206173
PCT Pub. Date: Oct. 14, 2021

(65) Prior Publication Data
US 2023/0225260 A1      Jul. 20, 2023

(30) Foreign Application Priority Data

Apr. 11, 2020      (JP) ................................ 2020-071382

(51) Int. Cl.
*A01G 9/24*          (2006.01)
*A01G 9/26*          (2006.01)
(52) U.S. Cl.
CPC .............. *A01G 9/26* (2013.01); *A01G 9/246* (2013.01); *A01G 9/249* (2019.05)

(58) Field of Classification Search
CPC .......... A01G 9/24; A01G 9/245; A01G 9/246; A01G 9/247; A01G 9/26; A01G 9/249
See application file for complete search history.

(56) References Cited

U.S. PATENT DOCUMENTS

2002/0088173 A1      7/2002   Hessel et al.
2016/0050862 A1*    2/2016   Walliser ................. A01G 31/02
(Continued)

FOREIGN PATENT DOCUMENTS

AU          2018286425 A1      3/2019
CA          3097969 A1      10/2019
(Continued)

OTHER PUBLICATIONS

Written Opinion of the International Searching Authority dated Jun. 22, 2021.

*Primary Examiner* — Joshua J Michener
*Assistant Examiner* — Henry Hooper Mudd
(74) *Attorney, Agent, or Firm* — Jacob M. Ward; Ward Law Office LLC

(57)          ABSTRACT

To provide a mechanism for performing environment control in a plant cultivation device and process control regarding to a work process for cultivating a plant. A plant cultivation device includes a plurality of sensors for monitoring a growing condition of a plant to be cultivated; an environment controlling unit for controlling an environment which is a condition of at least one of light, air, water, and space in the plant cultivation device; and a process controlling unit for controlling a work process for cultivating the plant.

19 Claims, 13 Drawing Sheets

(56) References Cited

U.S. PATENT DOCUMENTS

| | | | |
|---|---|---|---|
| 2019/0075741 A1 | 3/2019 | Olesen et al. | |
| 2019/0183062 A1* | 6/2019 | Pham ...................... | A01G 9/02 |
| 2019/0208711 A1* | 7/2019 | Sahu ........................ | A01G 7/04 |
| 2019/0259108 A1* | 8/2019 | Bongartz ............... | G06Q 50/02 |
| 2020/0359570 A1* | 11/2020 | Portello .................. | A01G 9/18 |
| 2024/0040972 A1* | 2/2024 | Krijn ....................... | A01G 9/26 |

FOREIGN PATENT DOCUMENTS

| | | | |
|---|---|---|---|
| JP | 2006333744 A | 12/2006 | |
| JP | 2008061575 A | 3/2008 | |
| JP | 2012080790 A | 4/2012 | |
| JP | 2012187074 A | 10/2012 | |
| JP | 2013165671 A | 8/2013 | |
| JP | 2014057570 A | 4/2014 | |
| JP | 2014132847 A | 7/2014 | |
| JP | 6012324 B2 | 10/2016 | |
| JP | 6018765 B2 | 11/2016 | |
| JP | 2016195548 A | 11/2016 | |
| JP | 6261492 B2 | 1/2018 | |
| JP | 2018171042 A | 11/2018 | |
| JP | 6522269 B1 | 5/2019 | |
| JP | 2019068768 A | 5/2019 | |
| JP | 2019191972 A | 10/2019 | |
| JP | 2019216629 A | 12/2019 | |

* cited by examiner

210

220

820

830

1210
Plant varieties

| Item | Content |
|---|---|
| Variety name | Tokkyo lettuce |

1200  Basic recipe

1220
Specifications

| Item | Unit |
|---|---|
| Weight of strains | g/strain |
| Productivity per area. | g/m²/day |
| Flavor | Undecided |
| Composition | Undecided |

1230
Environmental value data

| Item | Unit | Basic threshold | Passage of time (time) | | | | | |
|---|---|---|---|---|---|---|---|---|
| | | | 0 | 48 | 64 | 72 | 144 | ... |
| Cultivation density | Number of holes in a panel | ± | 150 | 150 | | | | |
| Light wavelength | Distribution | ± | omitted | omitted | | | | |
| PPFD | μmol/m2/s | ±10 | 150 | 200 | | | | |
| Temperature | °C | ±1 | 25 | 30±0.5 | | | | |
| Humidity | %RH | ±5 | 70 | 70 | | | | |
| CO2 | ppm | ±100 | 1000 | 1000 | | | | |
| EC | dS/m | ±0.1 | 1.5 | 1.5 | | | | |
| pH | - | ±0.1 | 6.5 | 6.5 | | | | |
| Various ion concentrations | ppm | ±10 | 400 | 400 | | | | |
| Water temperature | °C | ±1 | 25 | 25 | | | | |
| Water flow velocity | L/min/strain | ± | 0 | 0 | | | | |
| Horizontal air flow rate | m/sec | ±0.1 | 0.5 | 0.5 | | | | |
| Air flow rate from above | m/sec | ±0.1 | 0.5 | 0.5 | | | | |
| Dissolved oxygen concentration | ppm | ± | out of management | out of management | | | | |

1240
Index value alert data

| Item | Unit | Basic threshold | Passage of time (time) | | | | | |
|---|---|---|---|---|---|---|---|---|
| | | | 0 | 48 | 64 | 72 | 144 | ... |
| Photosynthesis rate | g/h | ± | | | | | | |
| Evaporation rate | g/m^2/h | ± | | | | | | |
| Water absorption rate | g/m^2/h | ± | | | | | | |
| Area of leaves | cm | ± | | | | | | |
| Height of leaves | mm | ± | | | | | | |
| Number of leaves | Number | ± | | | | | | |
| Weight of strains | g | ± | | | | | | |
| Abnormal growth | presence or absence | ± | | | | | | |
| Number of bacteria | CFU/g | ± | | | | | | |

FIG. 12

1300 Work recipe

1310

Work environment

| | Work process | Sowing | 150→32 transplanting | 32→12 transplanting | Harvesting | Trimming | Packaging | Storing | Transporting |
|---|---|---|---|---|---|---|---|---|---|
| | Hours worked | 300s | 120s | 100s | 10s | 10s | 10s | 24h | |
| Cultivation density | Number of holes in a panel | – | – | – | – | – | – | – | – |
| Light wavelength | Distribution | – | – | – | – | – | – | – | – |
| PPFD | $\mu$mol/m2/s | – | – | – | – | – | – | – | – |
| Temperature | ℃ | ±5℃ | ±5℃ | ±5℃ | ±5℃ | Below 20℃ | Below 15℃ | 5℃ | 5℃ |
| Humidity | %RH | ±10% | ±10% | ±10% | ±10% | – | – | – | – |
| CO2 | ppm | 400-1000 | 400-1000 | 400-1000 | 400-1000 | 400-1000 | 400-1000 | – | – |
| EC | dS/m | – | – | – | – | – | – | – | – |
| pH | – | – | – | – | – | – | – | – | – |
| Various ion concentrations | ppm | – | – | – | – | – | – | – | – |
| Water temperature | ℃ | – | – | – | – | – | – | – | – |
| Water flow velocity | L/min/strain | – | – | – | – | – | – | – | – |
| Horizontal air flow rate | m/sec | – | – | – | – | – | – | – | – |
| Air flow rate from above | m/sec | – | – | – | – | – | – | – | – |
| Dissolved oxygen concentration | ppm | – | – | – | – | – | – | – | – |

1320

Work constraint condition

| | Work process | Sowing | 150→32 transplanting | 32→12 transplanting | Harvesting | Trimming | Packaging | Storing | Transporting |
|---|---|---|---|---|---|---|---|---|---|
| | Hours worked | 300s | 120s | 100s | 10s | 10s | 10s | 24h | |
| | Constraint condition | xxxxxx | xxxxxx | xxxxxx | xxxxxx | – | – | – | – |

FIG. 13

Processing flow for registering a recipe  1400

Processing flow for managing an environment  1500

Processing flow for monitoring a growing condition

PLANT CULTIVATION DEVICE AND PLANT CULTIVATION METHOD

CROSS REFERENCE TO RELATED APPLICATIONS

This application is a National Stage of International Application No. PCT/JP2021/015081, filed Apr. 9, 2021, which in turn claims the benefit of Japanese Patent Application 2020-071382, filed Apr. 11, 2020. The entire disclosures of the above applications are hereby incorporated herein by reference.

FIELD OF THE INVENTION

The present invention relates to a device and a method for cultivating a plant.

BACKGROUND OF THE INVENTION

With respect to the background art, there is a patent document, JP2008-61575A (Patent Document 1) on this technical field. The following is described in this publication. "A plant management device 1*a* is provided to prompt proper management of cultivation by informing a user of a cultivation condition according to a growing environment for each plant. The plant management device 1*a* includes a temperature detecting unit 16, a humidity detecting unit 17, and an illumination detecting unit 18 for detecting various values indicating conditions of a peripheral environment of plant; a first memory unit 11 for storing various values detected from the temperature detecting unit 16, the humidity detecting unit 17, and the illumination detecting unit 18; and a CPU (Central Processing Unit) 10 for discriminating an existence or nonexistence of abnormality in the cultivation condition of the plant and a problem tendency based on a predetermined decision reference information and the various values detected from the temperature detecting unit 16, the humidity detecting unit 17, and the illumination detecting unit 18; an indicating lamp 14 and a sounding unit 15 for informing the cultivation condition of the plant according to the determined result of the cultivation condition of the plant by the CPU 1; and a first communication unit 12 for sending various detected values stored in the first memory unit 11 to an external device 2*a* according to a power supply generated by an induced electromagnetic field or electric wave supplied from the external device 2*a* (i.e. the abstract)."

SUMMARY OF THE INVENTION

A mechanism for informing a user about a cultivation condition in a plant cultivation device is disclosed in the Patent Document 1. However, a mechanism for performing a process control regarding to a work process for cultivating a plant is not disclosed in the plant cultivation device of the Patent Document 1.

Accordingly, it is the object of the invention to provide a mechanism for performing the both of an environmental control in a plant cultivation device and a process control regarding to a work process for cultivating a plant.

In addition, a mechanism for performing the environmental control and the process control in the plant cultivation device according to a recipe received from a management server is provided.

For example, by employing configurations described in the claims, the above-mentioned problems are solved.

According to the present application, there are a plurality of ways for solving the problems. For example, the present application provides a plant cultivation device (or a device for cultivating plant) which includes a plurality of sensors for monitoring a growing condition of a plant to be cultivated; an environment controlling unit for controlling an environment which is a condition of at least one of light, air, water, and space in the plant cultivation device; and a process controlling unit for controlling a work process for cultivating the plant.

According to the present invention, it becomes possible to provide a mechanism for performing the both of an environmental control in the plant cultivation device and a process control regarding to a work process for cultivating a plant.

Also, it becomes possible to provide a mechanism for performing the environmental control and the process control in the plant cultivation device according to a recipe received from a management server.

The problems, configurations and effects other than the above will be clarified by the following description of the embodiment.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above, as well as other advantages of the present disclosure, will become readily apparent to those skilled in the art from the following detailed description, particularly when considered in the light of the drawings described hereafter.

FIG. 12 is an example of a basic recipe 1200.

FIG. 13 is an example of a work recipe 1300.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical unless otherwise disclosed.

A cultivation device of the present invention is configured to be used in a plant factory depending on an artificial light source. In a case of a plant factory having a large scale of production, it has been known that controlling a cultivation environment is difficult. The cultivation device of the present invention is configured to be used suitably in such a plant factory.

A cultivation device 1A in relation with a first embodiment will be described with referring to FIGS. 1-7.

Figure 1:
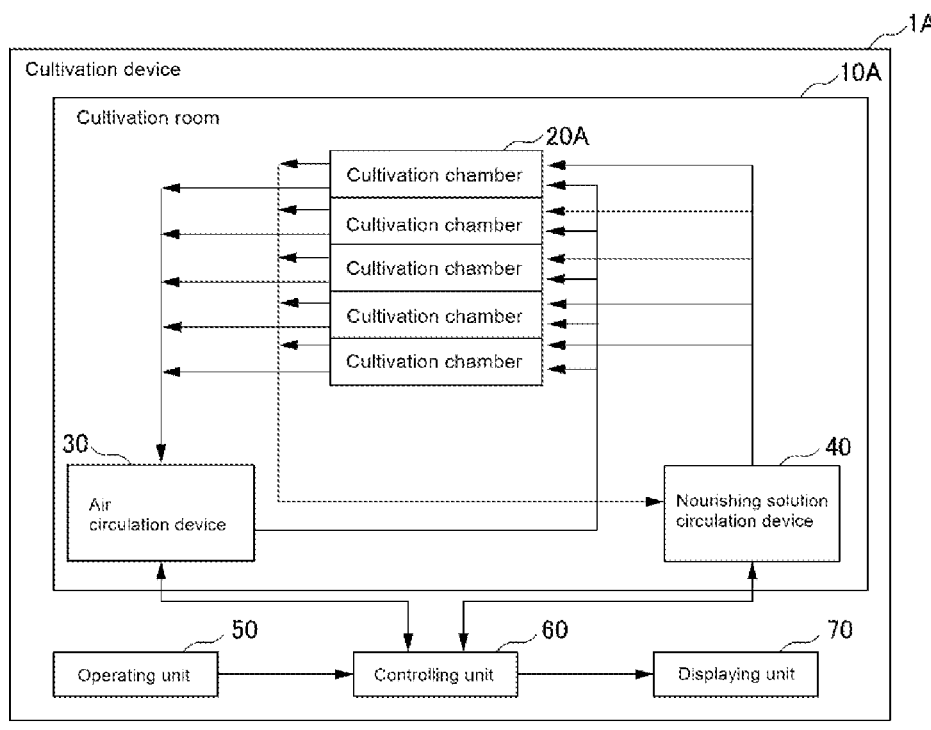
FIG. 1 is an example of a functional diagram illustrating a configuration of a cultivation device 1A.

FIG. 1 is an example of a functional diagram illustrating a configuration of a cultivation device 1A of the invention.

The cultivation device (or a device for cultivating plant) 1A is configured to include a cultivation room 10A, a plurality of cultivation chambers 20A, an air circulation device (or a device for circulating an air) 30, a nourishing solution circulation device (or a device for circulating a nourishing solution) 40, an operating unit 50, a controlling unit 60, and a displaying unit 70.

Figure 2:
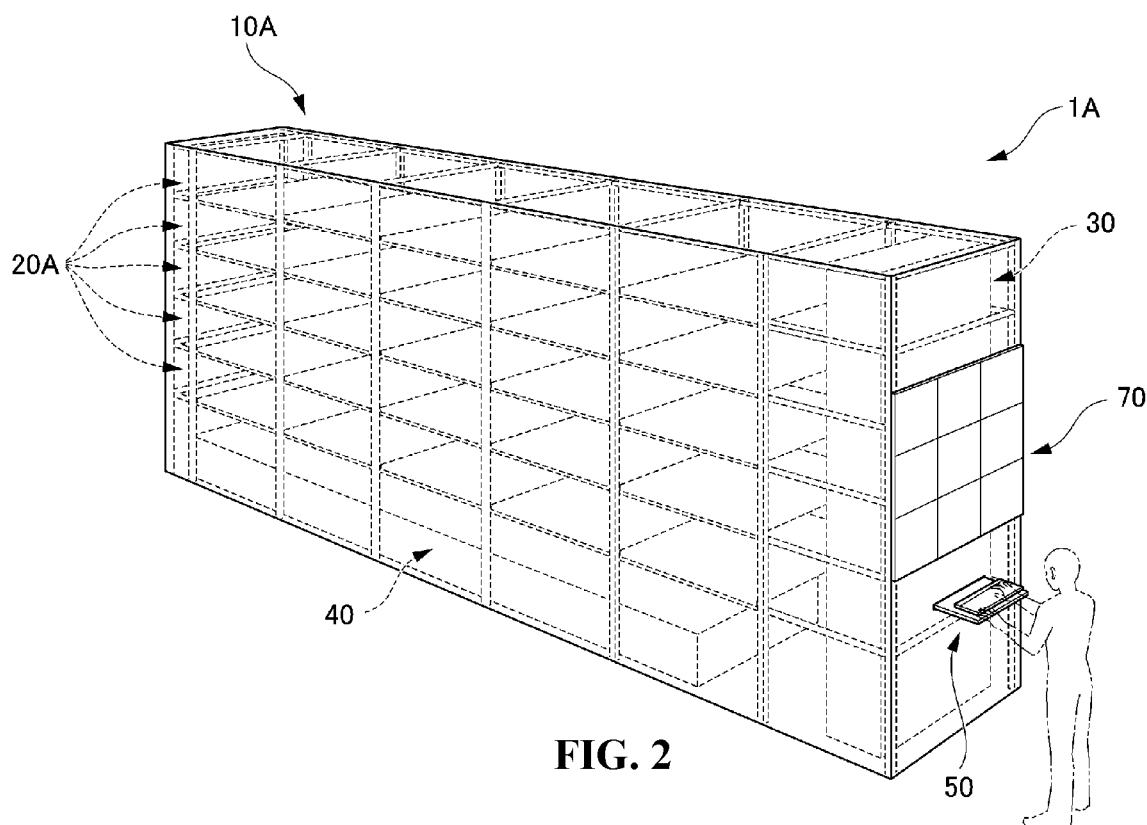
FIG. 2 is an example of an external view of the cultivation device 1A.
Figure 3:
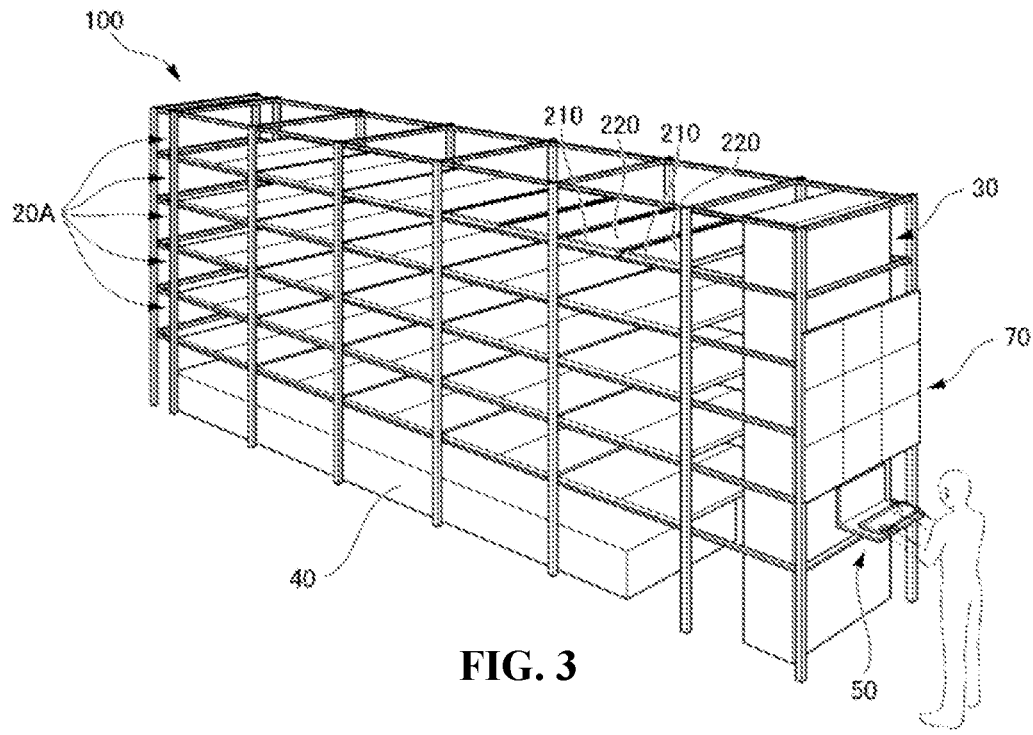
FIG. 3 is an example of an internal view of the cultivation device 1A.

As depicted in FIG. 2, the cultivation room 10A has an outer wall formed in a rectangular parallelopiped shape for closing or sealing the inside thereof, by which the cultivation room 10A is made to be able to maintain its cultivation environment independent from an environment (for example, a temperature and/or a humidity) of a work room of a plant factory in which the cultivation device 1A is disposed. As a material of the outer wall, it is preferable to use a heat insulating material so as to be less susceptible to an environmental influence of the work room which is outside of the cultivation room 10A. Referring to FIG. 3, the cultivation device 1A is depicted under a condition where the outer wall of the cultivation room 10A is removed.

Figure 4:
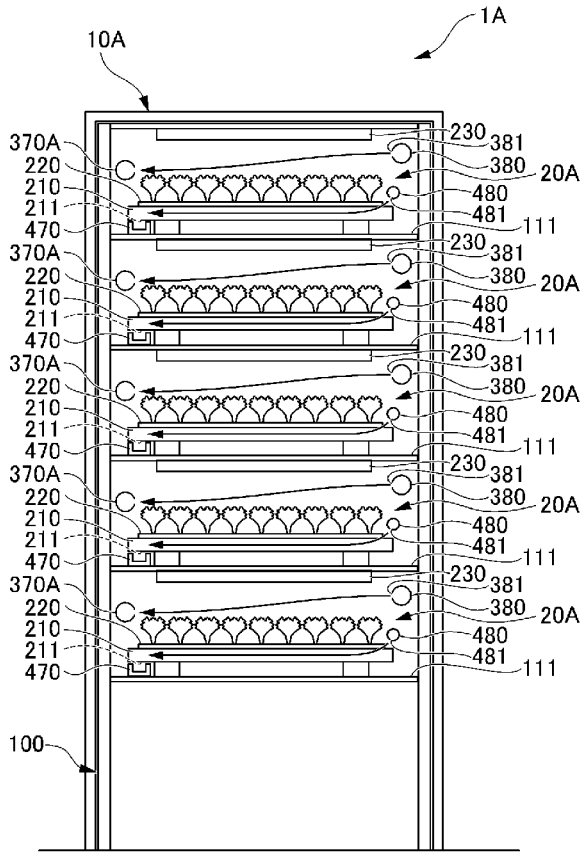
FIG. 4 is an example of a sectional view of a cultivation room 10A as seen from a longitudinal direction.

FIG. 4 is an example of a sectional view of the cultivation room 10A according to the present invention as seen from a longitudinal direction.

As depicted in FIG. 4, a plurality of cultivation chambers 20A are formed by partitioning the cultivation room 10A by shelf boards 111 which are located at predetermined intervals in an up-and-down direction. Each of the cultivation chambers 20A has a substantially rectangular parallelepiped shape. The plurality of cultivation chamber 20A may be configured by providing an exterior material to a conventionally known multistage type cultivation shelf. In the embodiment, it is configured by providing the exterior material (i.e. the outer wall of the cultivation room 10A) to a five-stage type cultivation shelf 100.

Figure 5A:
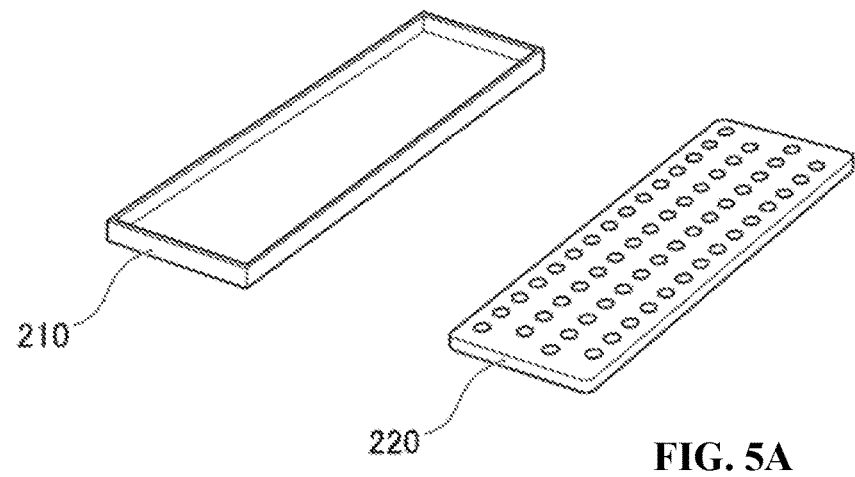
FIG. 5A is an example of a cultivation plate and a cultivation tray which are provided in the cultivation device 1A.
Figure 5B:
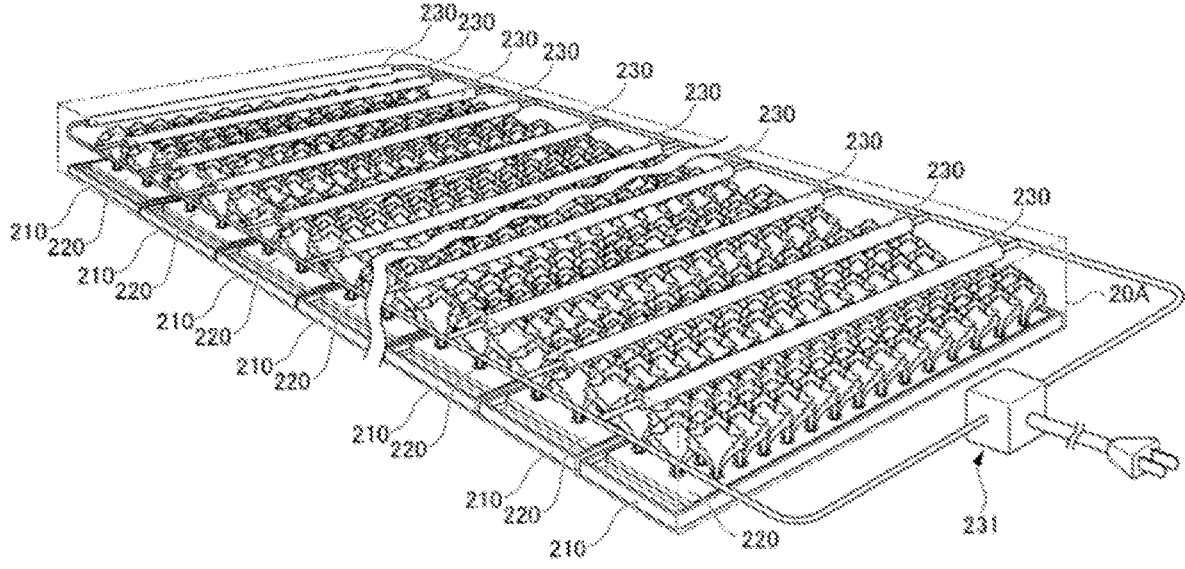
FIG. 5B is an example for illustrating an artificial light source included in the cultivation device 1A.

In each of the cultivation chambers 20A, a plurality of nourishing solution trays 210 and cultivation plates 220 are provided (c.f. FIG. 5A). In this case, a lateral direction of the nourishing solution trays 210 and a lateral direction of the cultivation plates 220 are directed along a longitudinal direction of the cultivation chamber 20A (c.f. FIG. 5B). The nourishing solution tray 210 has a substantially same size as that of the rectangular cultivation plate 220, and the nourishing solution tray 210 is configured as a rectangular tray so as to fit the cultivation plate 220 therein. In this embodiment, sixteen items are provided on each of the cultivation chambers 20A in a state in which the cultivation plate 220 is fitted into the nourishing solution tray 210 having a size of approximately 30 cm×120 cm (c.f. FIG. 5B).

As for the shape of the cultivation chamber 20A, it is preferable that the cultivation chamber 20A has a lengthy shape in which a length along a longitudinal direction is more than double a length along a lateral direction (or a transverse direction), because the cultivation chamber 20A is preferably used in a plant factory having a relatively larger scale of production. In the embodiment, the ratio of the length along the lateral direction to the length along the longitudinal direction is one to five (i.e. lateral direction length:longitudinal direction length=1:5). Please notice that the size of the cultivation chamber 20A (or the number of cultivation plates 220 arranged in the cultivation chamber 20A) is not limited to the above-mentioned size of the embodiment.

In addition, according to the embodiment, the nourishing solution tray 210 and the cultivation plate 220 are depicted as being rectangular. Please notice that the shapes are not limited to the example. For example, the shapes may be square. In such a case, one side of the square cultivation plate 220 is arranged along the longitudinal direction of the cultivation chamber 20A.

In this manner, in a state where the nourishing solution trays 210 are arranged, each of the plurality of cultivation chambers 20A is in a closed condition or semi-closed condition.

In each of the nourishing solution trays 210, a discharge port 211 for discharging a supplied nourishing solution (c.f. FIG. 4) is formed on one end side along the longitudinal direction (or downstream side of a flow of the nourishing solution). In addition, the nourishing solution tray 210 is provided with an inclined surface which is inclined at a predetermined angle (for example, about 1 degree) with respect to the lateral direction of the cultivation chamber 20A. As a result, a downstream side of a flow of the nourishing solution is lowered. Consequently, the supplied nourishing solution will not stay in the nourishing solution tray 210, and a flow will be created in one direction at a predetermined flow rate according to a flow rate of the supplied flow. Further, a nourishing solution collect pipe 470, which will be described later, is arranged below each of the discharge port 211 (c.f. FIG. 4).

Please notice that the nourishing solution tray 210 may not have a size corresponding to one cultivation plate 220. It is possible to configure the nourishing solution tray 210 to arrange a plurality of cultivation plates 220 therein.

Further, as depicted in FIG. 5B, an artificial light source 230 is provided above each of the cultivation chambers 20A, and a light control device 231 for dimming the artificial light sources 230 is connected to them. In the embodiment, two artificial light sources 230 are arranged along the longitudinal direction of the nourishing solution tray 210 and that of the cultivation plate 220 (i.e. along the lateral direction of the cultivation chamber 20A). It is preferable to use an LED that consumes less power and is able to be configured to be thin, as the artificial light source 230. Also, it is possible to use a fluorescent lamp as the artificial light source.

As depicted in FIGS. 2 and 3, an air circulation device 30 is provided on one end side along the longitudinal direction of the cultivation room 10A adjacently to the cultivation shelf 100. The air circulation device 30 is configured to supply an air which is adjusted to a predetermined condition, to each cultivation chamber 20A at a predetermined flow rate, to collect the air that has passed through the inside of each cultivation chamber 20A, and to adjust the air to satisfy a predetermined condition. The air circulation device 30 repeats these tasks to perform a circulation feeding.

Figures 6, 7:
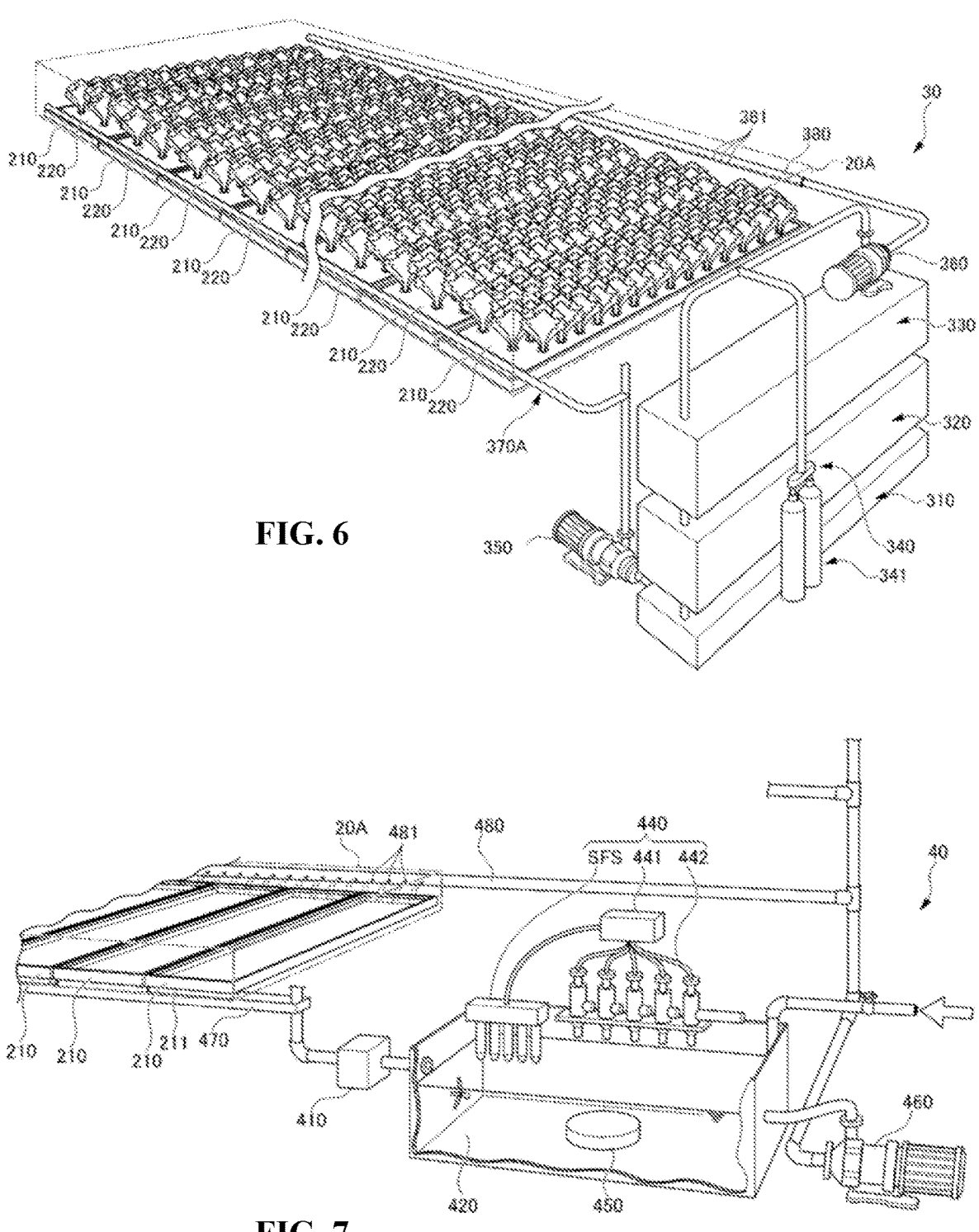
FIG. 6 is an example of an air circulation device which is provided in the cultivation device 1A.
FIG. 7 is an example of a nourishing solution circulation device which is provided in the cultivation device 1A.

A configuration of the air circulation device 30 will be described with reference to FIG. 6. The air circulation device 30 may have a function of adjusting at least a temperature, a humidity, a carbon dioxide concentration, and a flow rate (or an amount of flow) of air. The air circulation device 30 of the embodiment is configured to include an air sterilization device 310; a direct expansion type air conditioner 320 (or an air conditioner of a type of using a refrigerant for directly cooling air) having functions of heating, cooling and dehumidifying; a humidifying device 330 having a humidifying function; a carbon dioxide supply device 340 for adjusting a carbon dioxide concentration; a suction pump 350; and a compression pump 360.

As a device having a function of adjusting a temperature, it is possible to use an indirect expansion type chiller device (or a chiller device of a type of using a refrigerant for cooling air via water).

Each of the cultivation chambers 20A and the air circulation device 30 are connected via an air collect pipe 370A and an air supply pipe 380. The air collect pipe 370A and the air supply pipe 380 extend along the longitudinally direction of the cultivation chamber 20A. In the air collect pipe 370A, a plurality of air collect ports 371 are formed at predetermined intervals. Also, in the air supply pipe 380, a plurality of air supply ports 381 are formed at predetermined intervals. A constant flow rate valve (not shown) is also provided for these air supply ports 381.

Further, in each of the cultivation chambers 20, a temperature sensor, a humidity sensor, and a carbon dioxide concentration sensor (not shown) are provided at predetermined locations for monitoring a temperature, a humidity, and a carbon dioxide concentration of the circulating air.

By using the suction pump 350, the air is collected from each of the cultivation chambers 20A via the air collect pipe 370A. Then. The air is sterilized through the air sterilization device 310 and sent to the air conditioner 320. In the air conditioner 320, a temperature adjusting and a dehumidifying are carried out in accordance with measurement results obtained from the temperature sensor and the humidity sensor. Then, a humidifying is carried out in the humidifying device 330. Thereafter, in the carbon dioxide supply device 340, a carbon dioxide is supplied from a carbon dioxide supply source 341 such as a carbon dioxide cylinder or the like according to measurement results obtained from the carbon dioxide concentration sensor. Then, the air adjusted to a predetermined condition and a predetermined flow rate is supplied to each of the cultivation chambers 20A through the air supply pipe 380 by using the compression pump 360.

The set value of the flow rate of the air may be fixed. Alternatively, the set value may be made variable.

As depicted in FIG. 4, a flow direction of air in the cultivation chamber 20A is oriented along the lateral direction of the cultivation chamber 20A. Consequently, compared with a case where a flow direction of air is oriented along the longitudinal direction of the cultivation chamber 20A, it becomes possible to shorten a time period from supplying of air to collecting of air. Therefore, it becomes possible to suppress a change in the cultivation environment such as a temperature, a humidity, a carbon dioxide concentration or the like occurring on the upstream side and the downstream side of the air flow.

Without being limited by the above-mentioned case, a flow direction of air in the cultivation chamber 20A may be oriented from the upper side to the lower side of the cultivation chamber 20A.

In the embodiment, one cultivation device 1A is configured to include one cultivation room 10A, and the one cultivation room 10A is configured to include a plurality of cultivation chambers 20A and one air circulation device 30 in order to provide an air from the single air circulation device 30 to a plurality of cultivation chambers 20A.

However, without being limited by this, one cultivation device 1A may include one cultivation room 10A, and the one cultivation room 10A may include a plurality of cultivation chambers 20A and a plurality of air circulation devices 30 corresponding to each of the cultivation chambers 20A so that an air may be provided from the corresponding air circulation devices 30 to each of the cultivation chambers 20A. In this case, it becomes possible to change a temperature, a humidity, a carbon dioxide concentration, a flow rate (or an amount of flow) and the like of the circulating air for each of the cultivation chambers 20A.

In addition, one cultivation device 1A may include a plurality of cultivation rooms 10A, and each of the cultivation rooms 10A may include a plurality of cultivation chambers 20A and one air circulation device 30.

Further, one cultivation device 1A may include a plurality of cultivation rooms 10A, and each of the cultivation rooms 10A may include a plurality of cultivation chambers 20A and a plurality of air circulation devices 30 corresponding to each of the cultivation chambers 20A.

As depicted in FIGS. 2 and 3, the nourishing solution circulation device 40 is provided below the cultivation room 10A to supply a nourishing solution which is adjusted to a predetermined condition, to each of the nourishing solution trays 210 of the cultivation chambers 20A at a predetermined flow rate. The nourishing solution circulation device 40 is also configured to collect the nourishing solution that has passed through each of the nourishing solution trays, and to adjust the collected nourishing solution to satisfy a predetermined condition. The nourishing solution circulation device 40 repeats these tasks to circulate and supply a nourishing solution.

By referring to FIG. 7, a configuration of the nourishing solution circulation device 40 will be described. The nourishing solution circulation device 40 may have a function of adjusting, at least, a temperature and a nutrient content (i.e. various kinds of ions of the straight fertilizer such as nitrogen, phosphoric acid, potassium, and the like.) of a nourishing solution (or a nutrient fluid). In the embodiment, the nourishing solution circulation device 40 is configured to include a nourishing solution sterilization device 410; a nourishing solution tank 420 connected to an urban water supply source; a chiller device (not shown) having heating and cooling functions; a nutrient content supply device 440; an oxygen supply device 450 for adjusting a dissolved oxygen concentration by supplying an oxygen; and a nourishing solution pressure pump 460.

Each of the cultivation chambers 20A and the nourishing solution circulation device 40 are connected to each other via a nourishing solution collect pipe 470 and a nourishing solution supply pipe 480. The nourishing solution collect pipe 470 is configured to extend along the longitudinal direction of the cultivation chamber 20A and to collect the nourishing solution discharged from the discharge ports of the nourishing solution trays 210. The nourishing solution supply pipe 480 also extends along the longitudinal direction of the cultivation chamber 20A, and a plurality of nourishing solution supply ports 481 are formed at predetermined intervals in the nourishing solution supply pipe 480. The nourishing solution supply ports 481 may be opened downward in the nourishing solution supply pipe 480. However, as depicted in the embodiment, it is preferable to open the nourishing solution supply ports 481 to face a direction which is along a flow direction of the nourishing solution (c.f. FIGS. 4 and 7). As a result, it becomes possible to increase a flow rate of the nourishing solution as compared with a case where the nourishing solution supply ports are opened downward when a supply amount is equal.

In some embodiments, one cultivation device 1A may include one cultivation room 10A, and the one cultivation room 10A may include a plurality of cultivation chambers 20A and one nourishing solution circulation device 40 in order to provide a nourishing solution from the single nourishing solution circulation device 40 to each of the cultivation chambers 20A.

The set value of the flow rate of the nourishing solution may be fixed. Alternatively, the set value may be made variable.

However, without being limited by this, one cultivation device 1A may include one cultivation room 10A, and the one cultivation room 10A may include a plurality of cultivation chambers 20A and a plurality of nourishing solution circulation devices 40 corresponding to each of the cultivation chambers 20A so that a nourishing solution may be provided from the corresponding nourishing solution circulation devices 40 to each of the cultivation chambers 20A. In this case, it becomes possible to adjust a temperature, a nutrient content, a flow rate, and the like of the nourishing solution for each of the cultivation chambers 20A.

In addition, one cultivation device 1A may include a plurality of cultivation rooms 10A, and each of the cultivation rooms 10A may include a plurality of cultivation chamber 20A and one nourishing solution circulation device 40.

Further, one cultivation device 1A may include a plurality of cultivation rooms 10A, and each of the cultivation rooms 10A may include a plurality of cultivation chambers 20A and a plurality of nourishing solution circulation device 40 corresponding to each of the cultivation chambers 20A.

A water temperature sensor (not shown) is attached to the nourishing solution tank 420, and a single fertilizer sensor SFS for measuring concentrations of various nutrients is attached to the nourishing solution tank 420 in the vicinity of a connection port with the nourishing solution collect pipe 470 for monitoring a water temperature and ion concentrations of various single fertilizers of the nourishing solution which is circulating. The chiller device is able to adjust a temperature of the nourishing solution according to measurement results obtained from the water temperature sensor.

The nutrient content supply device 440 is configured to include an ion concentration control unit 441 for straight fertilizer, a straight fertilizer sensor SFS, and a supply plunger 442 for ions of straight fertilizer. In the nutrient content supply device 440, the ion concentration control unit 441 for straight fertilizer adjusts an ion concentration of straight fertilizer in a nourishing solution by driving the supply plunger 442 for ions of straight fertilizer according to the measurement results obtained from various straight fertilizer sensors SFS. The ion concentration of straight fertilizer in the nourishing solution may be measured by using a pH sensor and an EC sensor.

The nourishing solution stored in the nourishing solution tank 420 is adjusted to a predetermined water temperature by a chiller device. Then, it is adjusted to a predetermined ion concentration of straight fertilizer by the nutrient content supply device 440. Further, it is adjusted to a predetermined dissolved oxygen amount by the oxygen supply device 450. Then, the nourishing solution is supplied by the nourishing solution pressure pump 460 to the nourishing solution trays 210 arranged on each of the cultivation chambers 20A via the nourishing solution supply pipe 480. As depicted in FIG. 4, the nourishing solution flows through the nourishing solution trays 210 at a predetermined flow rate along the lateral directions of the cultivation chamber 20A. Then, the nourishing solution is discharged from the discharge port 211 of the nourishing solution trays 210. As a result, the nourishing solution flows into the nourishing solution collect pipe 470. The nourishing solution collected by the nourishing solution collect pipe 470 which is connected to the cultivation chamber 20A is sterilized by the nourishing solution sterilization device 410, then the nourishing solution flows into the nourishing solution tank 420.

At that time, a flow direction of nourishing solution in the cultivation chamber 20A is oriented along the lateral direction of the cultivation chamber 20A. Therefore, it becomes possible to shorten a time period from supplying of nourishing solution to collecting of nourishing solution as compared with a case where a flow direction of nourishing solution is oriented along the longitudinal direction of the cultivation chamber 20A.

The nourishing solution tank 420 may be provided for each cultivation chamber 20A or the nourishing solution tank 420 may be provided only one in the cultivation room 10A.

The operating unit 50 is comprised of a button, a keyboard and the like so as to make the cultivation room 10A have a predetermined cultivation environment. As depicted in FIGS. 1 and 2, the operating unit 50 is arranged outside one end side along the longitudinal direction of the cultivation room 10A (or the side where the air circulation device 30 is provided).

The controlling unit 60 is provided in the cultivation room 10A to receive signals from the air circulation device 30, the nourishing solution circulation device 40, and the operating unit 50 so as to control the air circulation device 30, the nourishing solution circulation device 40, and the displaying unit 70 which will be described later. For example, the controlling unit 60 is comprised of a computer device including a central processing unit, a RAM, a ROM, and the like.

The displaying unit 70 is configured to display measurement results which are monitored by various sensors provided in each of the cultivation chambers 20A in the cultivation room 10A, and to display the predetermined cultivation environment or the like which is set by the operating unit 50. The displaying unit 70 is comprised of a liquid crystal panel or the like. As depicted in FIGS. 2 and 3, the displaying unit 70 is provided outside one end side along the longitudinal direction of the cultivation room 10A (or the side where the air circulation device 30 is provided).

The operating unit 50, the controlling unit 60, and the displaying unit 70 may not be configured integrally with the cultivation room 10A. In other words, the operating unit 50, the controlling unit 60, and the displaying unit 70 may be configured separately from the cultivation room 10A. In that case, a control panel having the operating unit, the controlling unit, and the displaying unit may be provided at a predetermined location in a plant factory. As a result, cultivation environments of cultivation chambers 20A for each of the cultivation rooms 10A may be managed intensively by the control panel.

In a second embodiment, a configuration for controlling the cultivation device 1A according to a basic recipe 1200 and/or a work recipe 1300 received from a separate management server 820 will be described.

Figure 8:
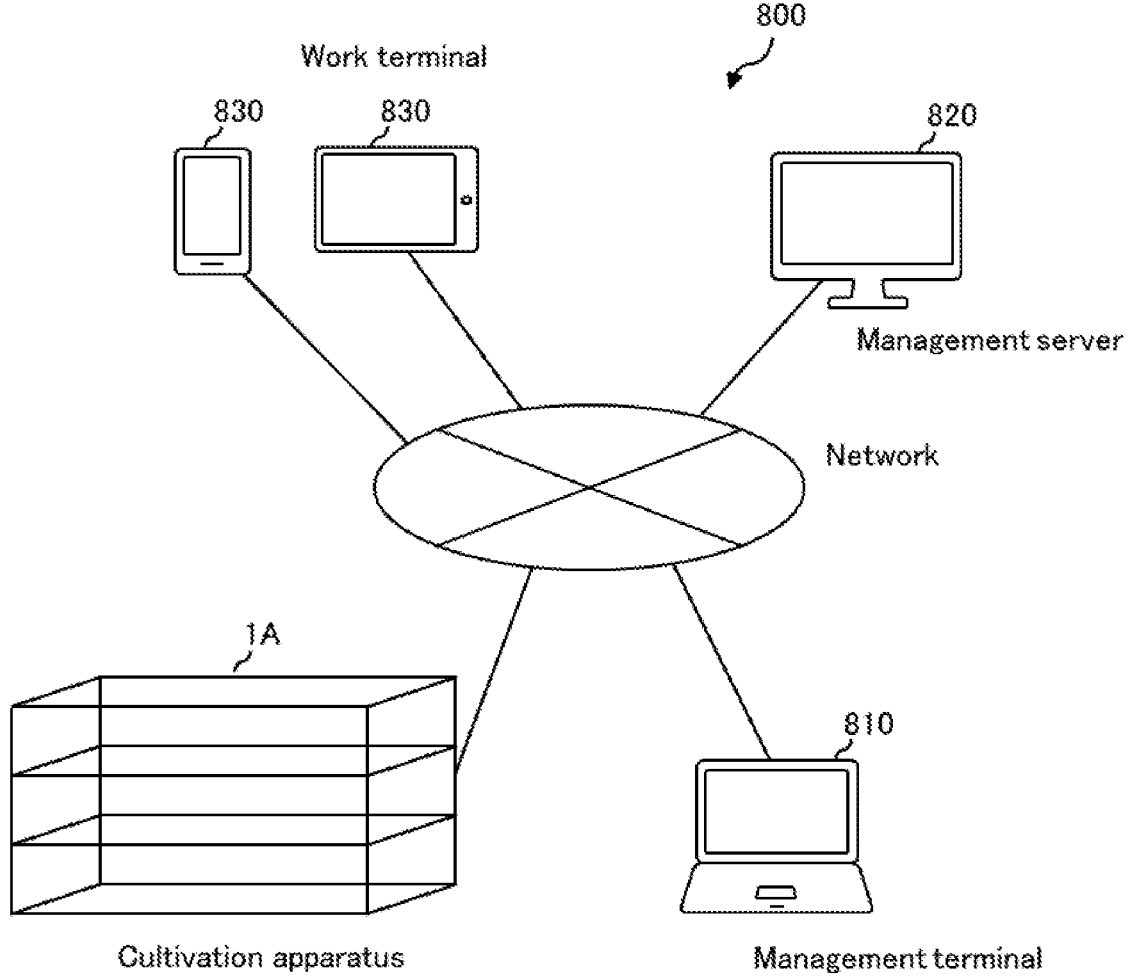
FIG. 8 is an example of an entire configuration of a plant cultivation system 800.

FIG. 8 depicts an example of an entire constitution of a plant cultivation system 800.

The plant cultivation system 800 includes a management terminal 810 and work terminals 830, and they are connected to a separate management server 820 via a network. The cultivation device 1A is able to be connected to the management server 820 via a network directly. Or it is also possible to connect the cultivation device 1A to the management server 820 via a network through the management terminal 810.

Each terminal may transmit and receive information via the network which may be either the one by cable or radio wave.

The management terminal 810 is configured as a terminal for managing and controlling the cultivation device 1A. The management terminal 810 may be configured to be incorporated in the cultivation device 1A. Alternatively, the management terminal 810 may be configured to be independent from the cultivation device 1A as a computer or the like to control the air circulation device 30, the nourishing solution circulation device 40, the artificial light source, and the like in the cultivation device 1A via the network.

The management server 820 is configured as a device for storing and managing a basic recipe 1200 and a work recipe 1300 which are configured to be read into the management terminal 810 or the cultivation device 1A.

The work terminal 830 is configured as a terminal for performing confirmation and inputting by a worker (or an operator) according to each work process for cultivating a plant.

Each of the terminals and the management server 820 of the plant cultivation system 800 may be, for example, a portable terminal (or a mobile terminal) such as a smartphone, a tablet, a mobile phone, or a personal digital assistant (PDA), or a wearable terminal such as a glasses-type terminal, a wristwatch-type terminal, a clothing-type terminal or the like. It may also be a stationary computer or a portable computer, or a server located on a cloud or network. As regards functions, it may be configured as a VR (Virtual Reality) terminal, an AR terminal, or an MR (Mixed Reality) terminal. Also, it may be configured as a combination of these terminals. For example, a combination of one smartphone and one wearable terminal may logically function as one terminal. In addition, it is possible to use other information processing terminal(s).

Each of the terminals and the management server 820 of the plant cultivation system 800 is configured to include a processor for executing an operating system, applications, programs, and the like; a main storage device (main memory) such as a RAM (Random Access Memory); an auxiliary storage device such as an IC card, a hard disk drive, a SSD (Solid State Drive), a flash memory; a communication control unit such as a network card, a wireless communication module, a mobile communication module; an input device such as a touch panel, a keyboard, a mouse, a voice input device, an input device based on detection of motions by imaging of a camera unit; and an output device such as a monitor, a display or the like. The output device may be a device or a terminal that transmits information to be outputted on an external monitor, a display, a printer, a device or the like.

Various programs and applications (or modules) are stored in the main storage device, and each functional element of the entire system is realized when the processor executes the programs and/or applications. Each of these modules may be implemented by hardware by integrating, etc. Also, each module may be implemented as an independent program or application, but it may be implemented in a form of a sub-program or function in a single integrated program or application.

In this specification, each module is described as a subject that performs processing. In practice, a processor that processes various programs, applications, and the like (modules) may be used to execute the processing.

In the auxiliary storage device, various databases (DB) are stored. Here, a "database" as used herein means a functional element (storage unit) that is able to store a data set to accommodate any data manipulation (e.g., extraction, addition, deletion, and/or overwriting of data) by a processor or an external computer. The method of implementing the database is not limited particularly. For example, it is possible to use a database management system, a spreadsheet software, or a text file such as XML, JSON or the like.

Figure 9:
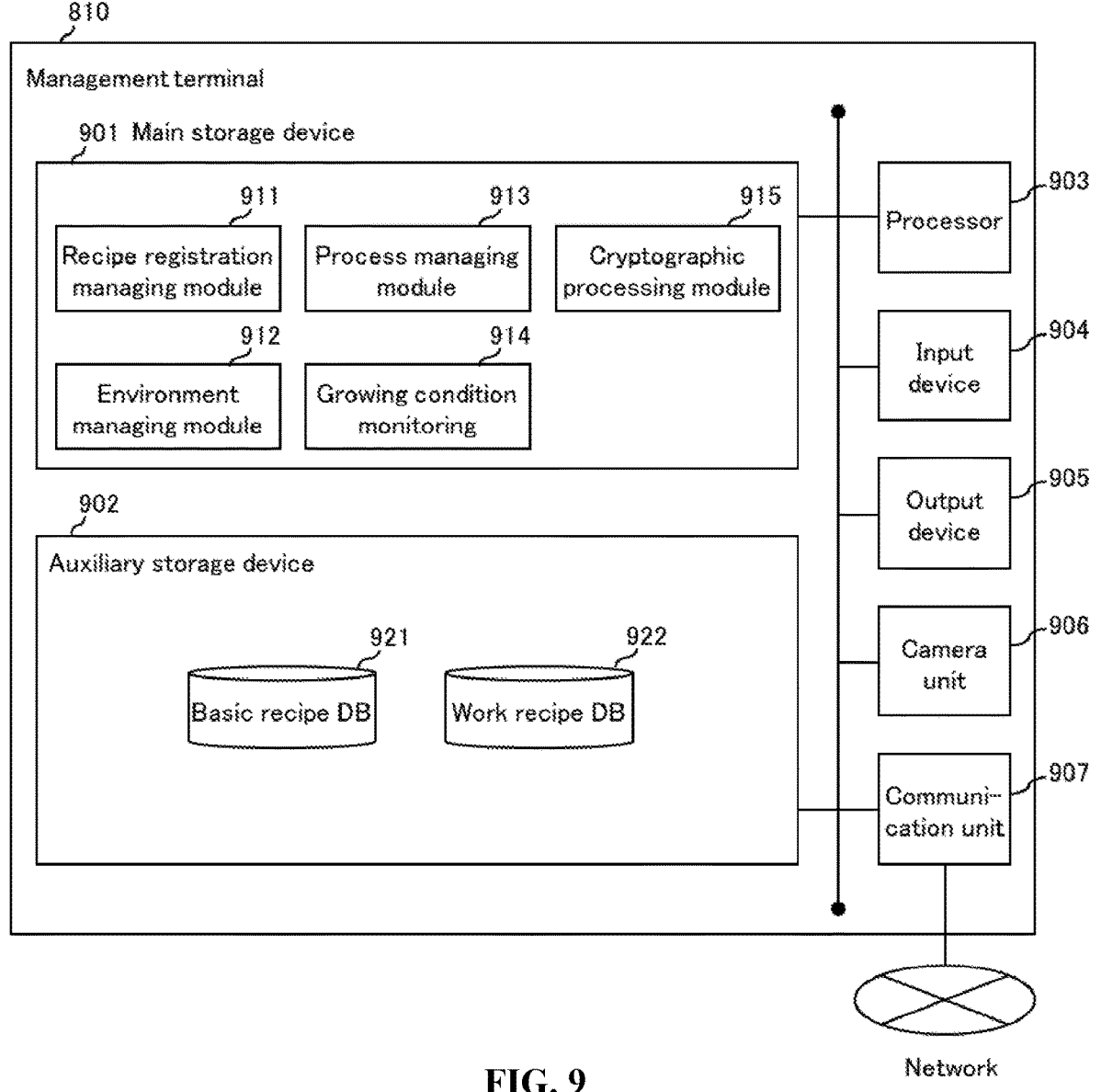
FIG. 9 is an example of a hardware configuration of a management terminal 810.

FIG. 9 depicts an example of a hardware configuration of the management terminal 810.

For example, the management terminal 810 is constituted by a terminal such as a smartphone, a tablet, a notebook PC, a desktop PC or the like.

In the main storage device 901, programs and applications such as a recipe registration controlling module 911, an environment controlling module 912, a process controlling module 913, a growing condition monitoring module 914, a cryptographic processing module 915 and the like are stored. When the processor 903 executes these programs and/or applications, each of the functional elements of the management server 101 can be realized.

The recipe registration controlling module 911 is configured to receive a basic recipe 1200 and a work recipe 1300 from the management server 820 to store them in a basic recipe DB 921 and work recipe DB 922, respectively.

The environment controlling module (or environment controlling unit) 912 is configured to manage an environment inside the cultivation device 1A according to the basic recipe that defines environmental value data (environmental value information) which is a condition of at least one of light, air, water, and space useful for cultivating a plant.

Specifically, the environment controlling module 912 is configured to read the basic recipe 1200 which is stored in the basic recipe DB 921. Then, according to the read information, the environment controlling module 912 controls the air circulation device 30, the nourishing solution circulation device 40, the artificial light source, a robot manipulator, a conveyor or the like in the cultivation device 1A in order to control a cultivation density, a light wavelength, a photon flux density, a temperature, a humidity, a carbon dioxide concentration, an electric conductivity, a pH value, various ion concentrations, a water temperature, a water flow velocity, a horizontal air flow rate, an air flow rate from above (upstream air flow rate), a dissolved oxygen concentration, or the like in the cultivation device 1A.

In addition, the environment controlling module 912 is configured to acquire, manage and control information relating to a cultivation density, a light wavelength, a photon flux density, a temperature, a humidity, a carbon dioxide concentration, an electric conductivity, a pH value, various ion concentrations, a water temperature, a water flow velocity, a horizontal air flow rate, an air flow rate from above, a dissolved oxygen concentration or the like read from various sensors which are provided in the cultivation device 1A.

The process controlling module (or process controlling unit) 913 is configured to manage a work process for cultivating a plant according to the work recipe which defines required work process to be performed in accordance with an elapsed time from a start time of plant cultivation. Here, the "start time" as used herein means, for example, either a start point for cultivating a plant or a point in time for sowing.

Specifically, the process controlling module 913 is configured to read the work recipe 1300 which is stored in the work recipe DB 922 in order to control a robot manipulator, a conveyor, or the like according to the read information for executing a work process for cultivating a plant.

Alternatively, the process controlling module 913 is configured to display each of the work steps necessary for the work process on the output device 905 such as the monitor, the external work terminal 830 or the like according to the work recipe 1300 for controlling or managing a work of a worker.

The growing condition monitoring module 914 is configured to monitor and display a growing condition of plant to be cultivated according to information acquired from various sensors. For example, a photosynthesis rate, an evaporation rate, a water absorption rate, an area of leaves, a height of leaves, a number of leaves (counts of leaves), a weight of strains, an abnormal growth, a number of bacteria (s) (counts of bacteria), or the like associated with a plant to be cultivated may be monitored.

The growing condition monitoring module 914 is configured to display both of an assumed growing condition when a plant is assumed to be cultivated according to the environmental value data defined in the basic recipe (or the assumed growing condition is assumed when the plant is cultivated according to the environmental value information), and an actual growing condition which is obtained from a plurality of sensors. The assumed growing condition and the actual growing condition are displayed in such a manner that the conditions can be compared. In addition, the growing condition monitoring module 914 is able to display an alert or change the basic recipe to be applied when the actual growing condition deviates from the assumed growing condition by a predetermined range or over, The cryptographic processing module 915 is configured to enhance a security of the plant cultivation system 800 by encrypting and/or decrypting contents of messages among the management server 820, the work terminal 830, the cultivation device 1A, and the various devices in the cultivation device 1A.

It is possible to make the cultivation device 1A as a device including the operating unit 50, the controlling unit 60 and the displaying unit 70 therein. However, it is also possible to substitute these units by the management terminal 810. In that case, the input device 904 may correspond to the operating unit 50, the processor 903 may correspond to the controlling unit 60, and the output device 905 may correspond to the displaying unit 70, respectively.

The auxiliary storage device 902 is configured to include the basic recipe DB 921 and the work recipe DB 922.

The basic recipe DB 921 stores the basic recipes 1200, and the work recipe DB 922 stores the work recipes 1300.

It is possible to implement the above-mentioned databases on a single database. Or it is also possible to implement them on more partitioned databases.

Figure 10:
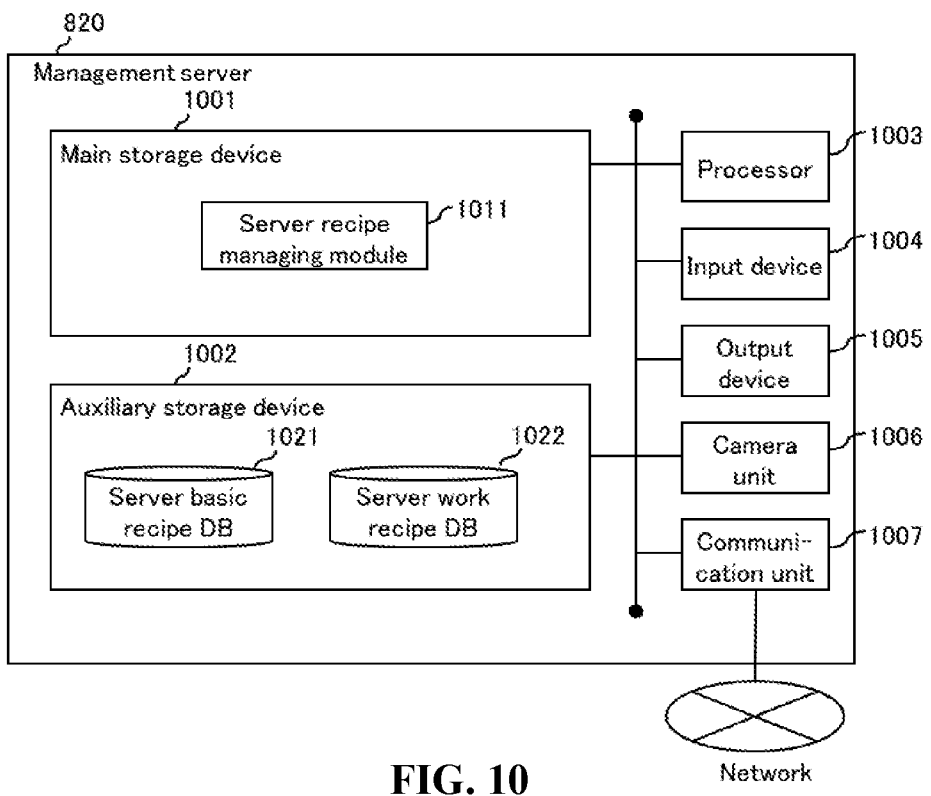
FIG. 10 is an example of a hardware configuration of a management server 820.

FIG. 10 depicts an example of a hardware configuration of the management server 820.

For example, the management server 820 is configured as a server which is arranged on a cloud.

In the main storage device 1001, programs and applications can be stored. For example, the server recipe controlling module 1011 is stored therein. When the processor 1003 executes these programs and/or applications, various functional elements of the management server 820 can be realized.

The server recipe controlling module 1011 is configured to manage the basic recipe 1200 and/or the work recipe 1300 stored in the server basic recipe DB 1021 and/or the server work recipe DB 1022 on the auxiliary storage device 1002.

Further, in response to the requirement from the management terminal 810 and/or the cultivation device 1A, the server recipe controlling module 1011 transmits the basic recipe 1200 and/or the work recipe 1300 to the management terminal 810 and/or the cultivation device 1A.

Figure 11:
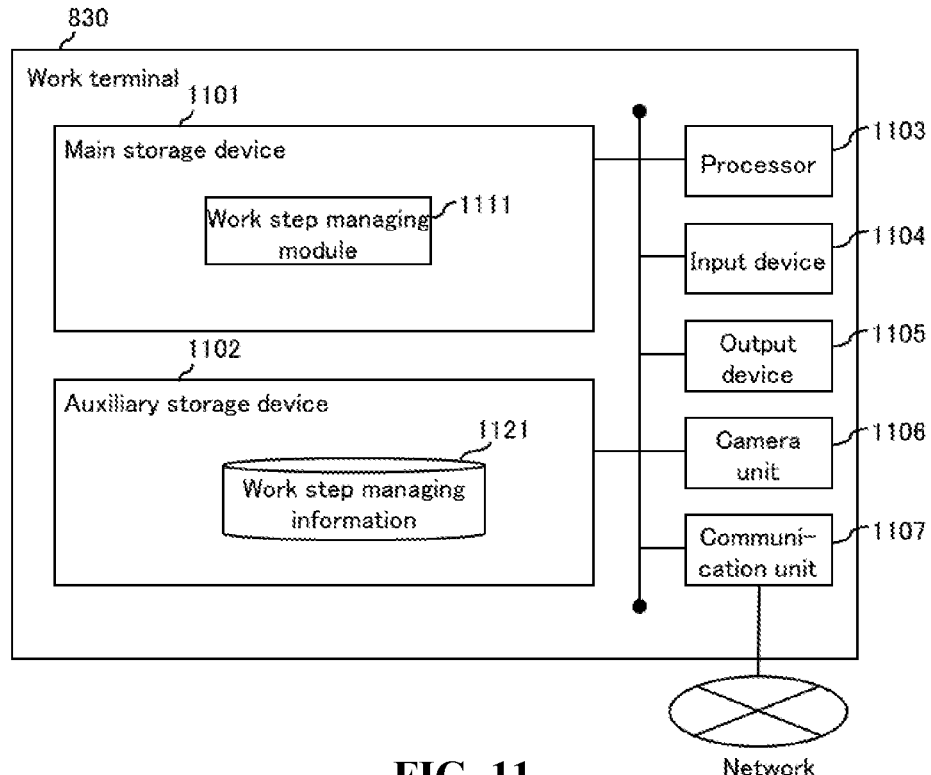
FIG. 11 is an example of a hardware configuration of a work terminal 830.

FIG. 11 depicts an example of a hardware configuration of the work terminal 830.

The work terminal 830 is composed of a terminal, for example, a smartphone, a tablet, a glass-type wearable terminal, a notebook PC, a desktop PC, or the like.

In the main storage device 1101, programs and applications including a work step controlling module 1111 and the like are stored. When the processor 1103 executes these programs and/or applications, various functional elements of the work terminal 830 can be realized.

The work step controlling module 1111 is configured to cooperate with the process controlling module 913 of the management terminal 810 to display information of each of the work steps in the work process for cultivating a plant, to receive inputs sequentially from a worker, and to control and/or confirm the progress of the work steps.

Information relating to each of the work steps of the work process based on the work recipe 1300, for example, information relating to a worker, contents of work, a work object and the like may be stored in the work step controlling information 1121 on the auxiliary storage device 1102.

The work terminal 830 is configured to include an input device 1104, for example, a bar code reader or a RFID reader. Thus, a progress of the work steps is able to be managed when a worker reads a bar code or a RFID tag at a timing in which each work step is performed.

In addition, by reading a bar code attached to a name tag or the like on a worker by the bar code reader, it becomes possible to manage information of a worker who performs the work.

Furthermore, by analyzing an image received from a built-in camera unit 1106 or an external camera unit 1106, it becomes possible to track a work of a worker, a movement of a worker, a movement of a cultivation plate, and/or a movement of a cultivation tray in the cultivation device 1A.

It is possible to configure the environment controlling module 912 to serve functions of the work terminal 830.

FIG. 12 depicts an example of the basic recipe 1200.

A plurality of basic recipes 1200 are defined according to a plurality of plant varieties 1210 to be cultivated and their specifications 1220. Therefore, it becomes possible to control and manage a cultivation environment of the cultivation device 1A with regards to plant varieties and specifications.

The basic recipe 1200 includes environmental value data 1230 which is a condition of at least one of light, air, water, and space useful for cultivating a plant in the cultivation device 1A. As the environmental value data 1230, for example, information such as a cultivation density, a light wavelength, a photon flux density (PPFD), a temperature, a humidity, a carbon dioxide concentration (CO2), an electric conductivity (EC), a pH value (pH), various ion concentrations, a water temperature, a water flow velocity, a horizontal air flow rate, an air flow rate from above, a dissolved oxygen concentration, or the like in the cultivation device may be defined. These values are defined to be applied in accordance with an elapsed time from a start time of cultivation.

The basic recipe 1200 includes index value alert data 1240 for indicating an assumed growing condition when a plant is assumed to be cultivated according to the environmental value data defined in the basic recipe. For example, as the index value alert data 1240, information such as a photosynthesis rate, an evaporation rate, a water absorption rate, an area of leaves, a height of leaves, a number of leaves, a weight of strains, an abnormal growth, a number of bacteria, or the like associated with a plant to be cultivated may be specified.

In the cultivation device 1A described in the embodiment, a cultivation environment of a plant to be cultivated may be appropriately managed according to the basic recipe 1200 and the work recipe 1300 which are managed by the management server 820. In addition, in a case when the cultivation device 1A is configured as a cultivation device that is able to be closed or substantially closed from the outside, it becomes possible to reproduce a special cultivation environment that greatly differs from the condition of outside air according to the basic recipe 1200.

For example, by using a photon flux density which is made higher than usual, by using a cultivation temperature which is made higher than usual, or by using a carbon dioxide concentration which is made higher than that of the human working environment, it becomes possible to cultivate a plant with higher productivity than ever, comparing to the case in cultivating a plant with a conventional plant factory.

By storing and managing these parameter values suitable for cultivating a plant in a form of the basic recipe 1200 on the management server 820 and by distributing these parameter values from the management server 820, it becomes possible to reproduce the same cultivation environment in a plurality of cultivation devices 1A even if these cultivation devices 1A are distributed in a plurality of different places.

FIG. 13 depicts an example of the work recipe 1300.

In the work recipe 1300, a work environment 1310 and a work constraint condition 1320 are defined for each of a plurality of work processes. The work recipe 1300 is configured to define work processes of cultivation to be performed in accordance with a change of an elapsed time from the start of cultivation, a condition of the plant cultivation device, a condition of the plant cultivation system 800, the environmental value data 1230 of the basic recipe 1200 (that is, a change in the environment), or the like.

The process control performed by the work recipe 1300 is managed based on an absolute time from a particular point in time such as sowing. Alternatively, it is possible to correlate the work recipe 1300 with the environmental value data 1230 of the basic recipe 1200. As a result, when the cultivation environment is changed and the environmental value data 1230 of the basic recipe 1200 is changed, the process management may be performed at the time of changing the growing environment, by referring to the work recipe 1300.

As for the work processes, for example, sowing, transplanting from 150 strains to 32 strains, transplanting from 32 strains to 12 strains, harvesting, trimming, packaging, storing, transporting and the like may be included. Here, a "process" as used herein means a progress of a series of activities which are consisted of growing of species of raw material, harvesting the plant, packing the plant, and shipping the plant as a product.

The work environment 1310 defines the constraint condition for the work environment to be satisfied in executing the work process, for each of the work processes. For example, for the work process of the "sowing", hours worked are defined as 300 seconds as the restriction condition. Also, as for a temperature, an allowable fluctuation range of a temperature is set to plus or minus 5 degrees from a reference temperature value of 25 degrees which is defined at 0 hours of elapsed time (at a timing of sowing) of the basic recipe 1200.

Similarly, other allowable fluctuation ranges during the work process of sowing are defined, for example, a fluctuation range of a humidity is set to plus or minus 10% from a reference value of the basic recipe 1200, and a fluctuation range of a carbon dioxide concentration is set to from 400 ppm to 1000 ppm.

Also, in the work constraint condition 1320, items which are required to be controlled for performing the work are also defined, apart from the work environment. For example, when the work is not automated, precautions or the like for working are specified for workers.

For example, the number of cultivations for each work process and a designation of a used stage and its position in the device for cultivating a plant are defined as the shelving logic.

In addition, at a time of reproducing a cultivation environment in the cultivation device 1A by the basic recipe 1200, there may be a case where a control method differs depending on the device. The control logic for each device defines the control content specific to each device. For example, in order to set the environmental temperature to 20 degrees, the set temperature of the air conditioner in a device X is set to 20 degrees. In addition, the set temperature is set to A+1 degrees for a device Y. Further, in a case that the air conditioner is not provided in a device Z, a different control content such as controlling the set temperature to 20 degrees by using a cold water and a hot water is defined for the device Z, In the work constraint condition 1320, the work step(s) (single process) to be performed at each work process is defined. The process controlling module 913 reads the work recipe 1300 stored in the work recipe DB 922 for controlling a robot manipulator, a conveyor, etc., according to the read information in order to perform the work process for cultivating a plant.

Alternatively, the process controlling module 913 displays each work step to be performed as the work process on the output device 905 such as a monitor, etc., or on the external work terminal 830, etc., according to the work recipe 1300 for managing or controlling a work of a worker.

For example, the following may correspond to one of the work steps: preparing a tool such as a tray for sowing, sowing of seeds by a worker, installing the sowed tray in an automated machine, moving the tray to a predetermined position by the automated machine, and growing a plant in an environment-controlled device or the like.

In a case where a work of a worker is monitored, a progress of a work step is managed by reading a bar code or a RFID tag which is connected to the work terminal 830 or the management terminal 810 by the worker at a timing at which each work step is performed.

In addition, by reading a bar code attached to a name tag or the like of the worker by using a bar code reader, information of the worker who performs the work may also be managed.

In this way, the entire work process is able to be managed and controlled by appropriately acquiring and managing at least one of information about the worker, the work content, and the work target for each work step (single process) to be performed in each work process in the work constraint condition 1320.

For the proper illustration of this, a process of transplantation from 150 strains to 32 strains (primary transplantation) will be described.

There are sub-processes in the primary transplantation, for example, a step for taking a cultivation tray out from the closed or semi-closed cultivation device 1A (i.e. shelf removing step), a step for transplanting (i.e. transplanting step), and a step for placing it in the cultivation device 1A again (i.e. shelf placing step) included as the sub-processes.

In the shelf removing step, for example, the following items are defined as the data to be acquired in the work constraint condition 1320.

1. The starting time of the work,
2. The ID of the person who has completed the work,
3. The ID of the device,
4. Indicating the content of the work (indicating the process of sowing and/or growing),
5. Reading the bar code attached to the device,
6. Confirming the tray ID of the cultivation tray to be taken out from the shelf of the cultivation device 1A,
7. Measuring the time when the shelf is opened,
8. Measuring the temperature difference caused by opening/closing the door of the cultivation tray,
9. Measuring the time when the cultivation tray is outputted from the shelf,
10. Measuring the time when the shelf is closed, and
11. Measuring the temperature difference caused by opening/closing the door of the cultivation device 1A for outputting the cultivating tray.

Further, as the data acquisition process, for example, the following items are defined in the work constraint condition 1320.

1. Acquiring information of the starting time of the work by reading the ID of the worker with the bar code reader,
2. Acquiring the start ID by reading the bar code attached to the cultivation device 1A,
3. Indicating the content of the work step of the work process by reading the bar code attached to the cultivation device 1A (indicating the process of sowing and/or growing),
4. Measuring the time when the door of the shelf is opened by acquiring the time when the door was opened with the handy switch,
5. Measuring the time when the cultivation tray is outputted from the shelf by acquiring a signal from the RFID reader which is provided at the entrance of the shelf,
6. Measuring the time when the door of the shelf is closed by acquiring the time when the door is closed with the handy switch, and
7. Acquiring the termination ID of the cultivation device 1A by reading the bar code attached to the cultivation device 1A.

Similarly, in the work recipe 1300, a transplanting step for transplanting and a shelf placing step for putting it into the cultivation device 1A again are defined.

According to the cultivation device 1A of the embodiment, it becomes possible to appropriately manage the work process for cultivating a plant based on a list of the work steps for each work process described in the work recipe 1300 managed by the management server 820, a confirmation thereof, and data information to be acquired, etc.

In a case that the cultivation device 1A is configured to be closed or substantially closed from the outside, the cultivation device 1A is sealed or semi-sealed based on the basic recipe 1200, and the cultivation tray is required to be outputted from the cultivation device 1A for performing a work process such as sowing, transplanting, harvesting, or the like.

The basic recipe 1200 defines environmental value data in the plant cultivation device, and the work recipe 1300 defines environmental value data to be satisfied when the plant to be cultivated is outputted to the outside from the plant cultivation device, for such a case, in the work environment 1310 and the work constraint condition 1320.

Figure 14:
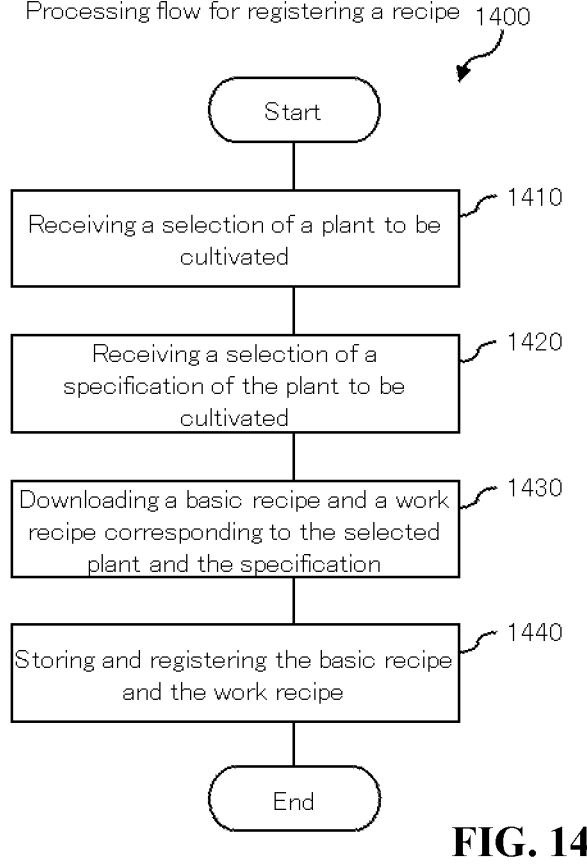
FIG. 14 is an example of a processing flow 1400 for registering a recipe.

FIG. 14 depicts an example of the processing flow 1400 for registering a recipe.

Firstly, the recipe registration controlling module 911 of the management terminal 810 receives a selection of a plant to be cultivated in the cultivation device 1A from a cultivation manager or a worker (step 1410).

Then, the recipe registration controlling module 911 receives a selection of a specification of the plant to be cultivated (Step 1420)

The recipe registration controlling module 911 downloads a basic recipe 1200 and a work recipe 1300 corresponding to the selected plant and the specification from the management server 820 (step 1430).

The recipe registration controlling module 911 registers the downloaded basic recipe 1200 and the work recipe 1300 in the basic recipe DB 921 and the work recipe DB 922 of the management terminal 810, respectively.

In the management server 820A, the basic recipes 1200 are registered for a plurality of plants and a plurality of specifications. Therefore, it becomes possible to control the cultivation device 1A for reproducing an optimum cultivation environment, by receiving and registering the basic recipe 1200 corresponding to the plant to be cultivated and the specification.

In addition, in the management server 820, the work recipes 1300 are registered for a plurality of plants and a plurality of specifications. Therefore, it becomes possible to control and manage the work process of the cultivation, by receiving and registering the work recipe 1300 corresponding to the plant to be cultivated and the specification.

Figure 15:
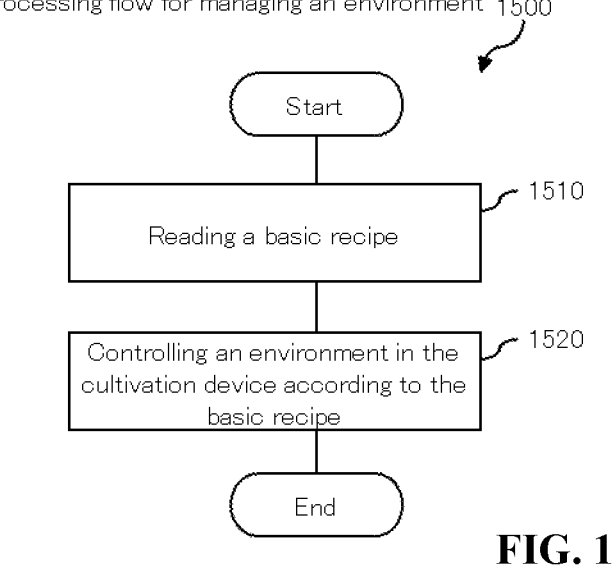
FIG. 15 is an example of a processing 1500 flow for controlling an environment.

FIG. 15 depicts an example of the processing flow 1500 for controlling the environment.

Firstly, the environment controlling module 912 of the management terminal 810 reads the basic recipe 1200 which is stored in the basic recipe DB 921 (step 1510).

Then, the environment controlling module 912 controls the environment in the cultivation device 1A according to the read basic recipe 1200.

For example, the environment controlling module 912 controls the air circulation device 30, the nourishing solution circulation device 40, the artificial light source, the robot manipulator, the conveyor and the like in the cultivation device 1A according to the environmental value data 1230 defined in the basic recipe 1200. Thus, the environment controlling module 912 is able to control a cultivation density, a light wavelength, a photon flux density, a temperature, a humidity, a carbon dioxide concentration, an electric conductivity, a pH value, various ion concentrations, a water temperature, a water flow velocity, a horizontal air flow rate, an air flow rate from above, a dissolved oxygen concentration, or the like in the cultivation device.

The cultivation device 1A of the embodiment is configured as a closed or semi-closed cultivation device. Therefore, without being affected by an air outside the cultivation device 1A, the cultivation device 1A is able to accurately control and manage the cultivation environment related to light, air, water, or space, based on the basic recipe 1200.

The cultivation device 1A is able to be applied not only to the closed or semi-closed cultivation device but also to an open type cultivation device for cultivating a plant in the same environment as the outside air in an environment in which a worker inside the cultivation plant performs a work. Based on the basic recipe 1200 downloaded from the management server 820, the cultivation environment such as light, air, water, or space relating to a plant to be cultivated in an open type shelf or the like is controlled and managed. Although not perfect, compared to the closed or semi-closed type cultivation device, it is possible to sufficiently control and manage the cultivation environment even in the open type cultivation device.

Figure 16:
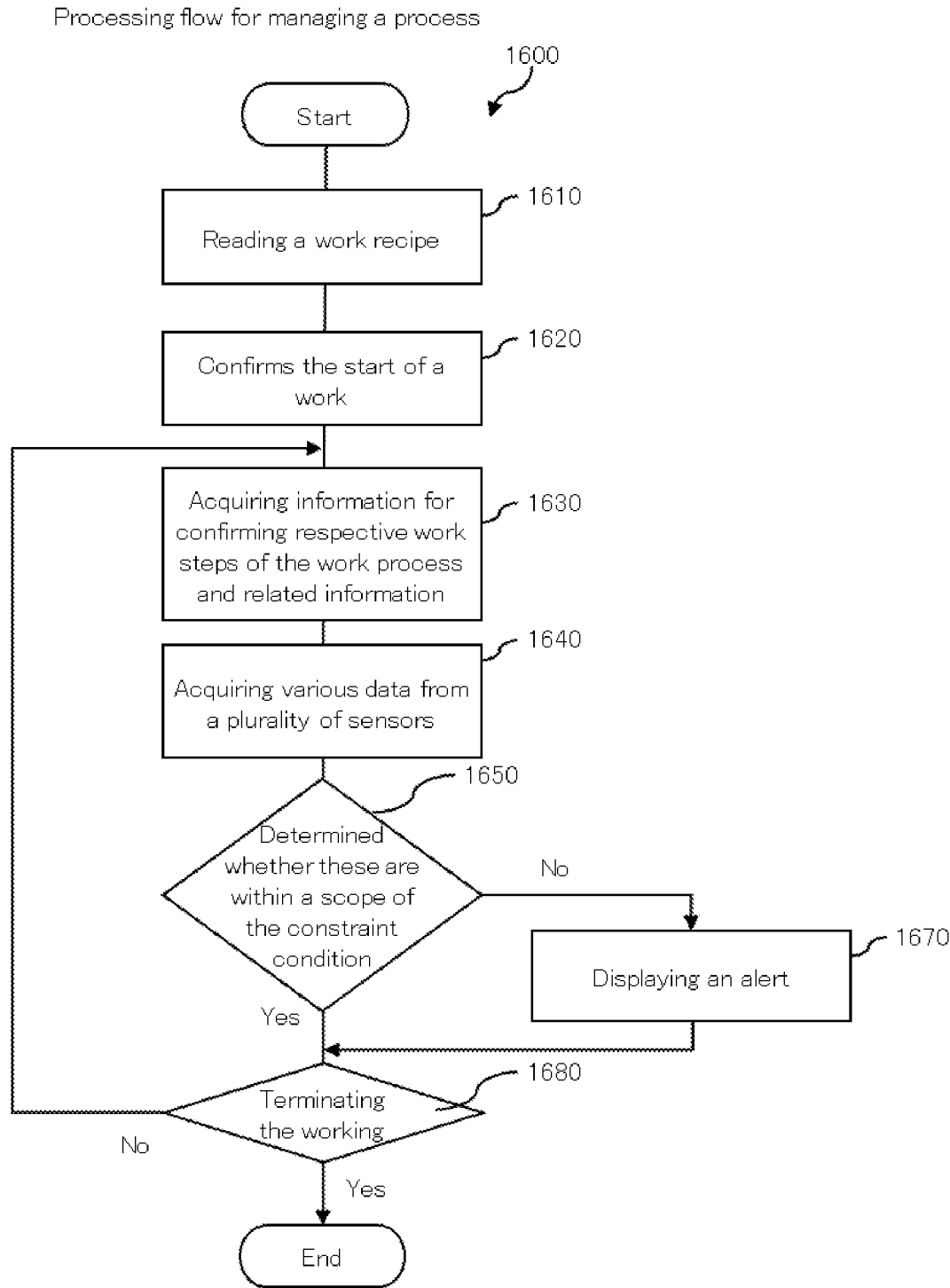
FIG. 16 is an example of a processing flow 1600 for controlling a process.

FIG. 16 depicts an example of the processing flow 1600 for controlling the process.

The process control processing flow 1600 is started in response to a change in the value of the environmental value data 1230 of the basic recipe 1200. Alternatively, it may be controlled based on the absolute time from a specific point in time, for example, at a time of sowing, etc., so as to be started when a predetermined time is reached.

The process controlling module 913 of the management server 820 reads the work recipe 1300 which is stored in the work recipe DB 922 (step 1610).

The process controlling module 913 confirms the start of the work for the work process defined in the work recipe 1300 (step 1620). For example, each of the work steps of the work process defined in the work recipe 1300 is displayed on a monitor or a screen of the work terminal 830 so that the worker is allowed to confirm the work content and tap a start button of the work.

Alternatively, by using the bar code reader, the camera, or the RFID reader connected to the work terminal 830, the start of the work may be confirmed by reading the information, the bar code, or the RFID tag, etc. for indicating the start of the work, Further, during the process in which the transplantation is performed, the start of the work may be confirmed by sensing an opening of the door of the cultivation device 1A for outputting the cultivation tray.

The process controlling module 913 acquires information for confirming each of the work steps of the work process defined in the work recipe 1300 and related information (step 1630).

According to the acquired work step, the worker, the robotic manipulator or the conveyor, etc., of the cultivation device 1A is allowed to perform each work step of the work process.

In a case where the worker performs the work step manually, it is possible to manage the progress of the work step by providing check items for each work step, and by acquiring confirmation data in response to input from the bar code reader, the RFID reader, or the worker for each check item.

The process controlling module 913 acquires various data relating to the environment or the like from a plurality of sensors such as the temperature sensor, the humidity sensor, the carbon dioxide concentration sensor and the like which are provided at the place of work in the cultivation device 1A and/or the outside of the cultivation device 1A (step 1640).

Then, the data of the environment or the like obtained from the sensors are determined whether these are within a scope of the constraint condition (that is, a scope of the work environment 1310 and the work constraint condition 1320) defined in the work recipe 1300 (step 1650).

In a case that the data are within the scope of the constraint condition (Yes in step 1650), each work step is performed as it is, and it is repeated until the end of the work (No in step 1680).

Alternatively, in a case that the data is outside the scope of the constraint condition (No in step 1650), an alert may be displayed (step 1670).

In the work environment 1310, the constraint condition for the work environment is defined, which is supposed to be satisfied for performing the work process. For example, for the work process of the "sowing", as the constraint condition, the working hours are defined as 300 seconds. Also, as for the temperature, a range of variation of the allowable temperature is set to plus or minus 5 degrees from a reference temperature value of 25 degrees at the elapsed time of 0 hours (at a time of sowing) defined in the basic recipe 1200.

The temperature in the closed or semi-closed cultivation device 1A is controlled to be 25 degrees Celsius according to the basic recipe 1200. In a case where the sowing is performed outside the cultivation device 1A, there may be a case that the temperature at the work place of the sowing is out of a range of 25 degrees plus or minus 5 degrees (i.e. out of a range from 20 to 30 degrees). In such a case, an alert may be notified.

Also, in a case where the hours worked exceed 300 seconds which are set as the constraint condition, an alert may be notified.

In this way, the cultivation device 1A of the embodiment is configured to seal the inside of the cultivation device 1A for cultivating plant from the outside, and the basic recipe 1200 defines the environmental value data in the cultivation device 1A. In addition, the work recipe 1300 defines the environmental value data to be satisfied when a plant to be cultivated is outputted to the outside from the cultivation device 1A.

Figure 17:
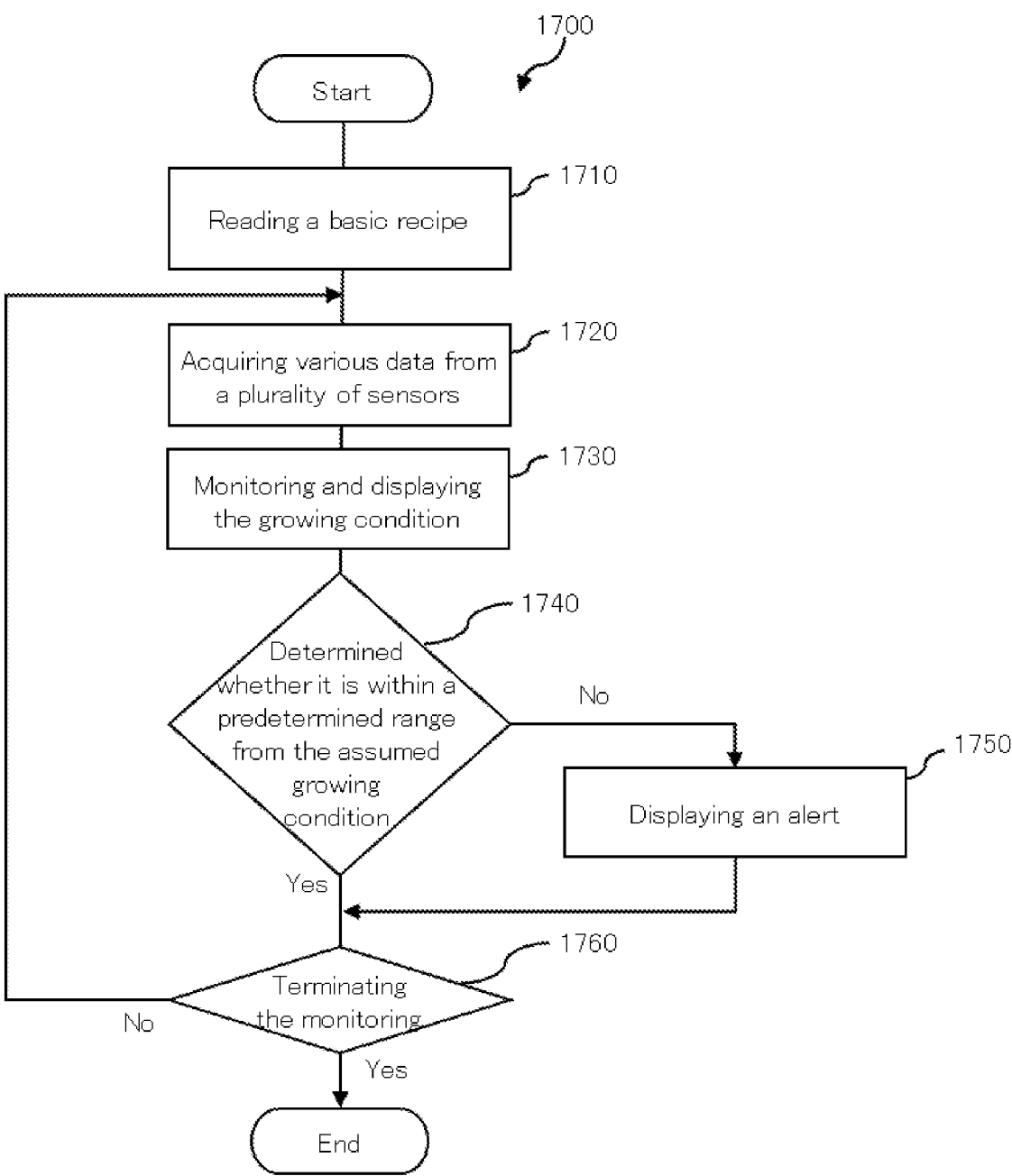
FIG. 17 is an example of a processing flow 1700 for monitoring a growing condition.

FIG. 17 depicts an example of the processing flow 1700 for monitoring a growing condition.

Firstly, the growing condition monitoring module 914 of the management server 820 reads the basic recipe 1200 stored in the basic recipe DB 921 (step 1710).

Then, the growing condition monitoring module 914 acquires various data from a plurality of sensors which are arranged inside and/or outside the cultivation device 1A (step 1720).

The growing condition monitoring module 914 monitors and displays the growing condition of the plant to be cultivated according to the information acquired from the various sensors (step 1730). For example, a photosynthesis rate, an evaporation rate, a water absorption rate, an area of leaves, a height of leaves, a number of leaves, a weight of strains, an abnormal growth, a number of bacteria, or the like associated with the plant to be cultivated may be monitored.

The growing condition monitoring module 914 displays an assumed growing condition when the plant is assumed to be cultivated according to the environmental value data 1230 defined in the basic recipe 1200, and also an actual growing condition which is obtained from a plurality of sensors. The assumed growing condition and the actual growing condition are displayed in such a manner that the conditions can be compared. The assumed growing condition is specified in the index value alert data 1240. For example, as the index value alert data 1240, information such as a photosynthesis rate, an evaporation rate, a water absorption rate, an area of leaves, a height of leaves, a number of leaves, a weight of strains, an abnormal growth, a number of bacteria, or the like associated with the plant to be cultivated may be defined.

The growing condition monitoring module 914 determines whether the actual growing condition is within a predetermined range from the assumed growing condition (step 1740). When the actual growing condition is out of a predetermined range or more from the assumed growing condition (for example, when the actual growing condition is deviated by 5% or more), an alert may be displayed (step 1750).

In addition, when the actual growing condition deviates from the assumed growing condition by a predetermined range or more, the growing condition monitoring module 914 may change the basic recipe 1200 which is applied to the cultivation device 1A, in cooperation with the environment controlling module 912.

The growing condition monitoring module 914 repeats the process for monitoring the growing condition until an end indication of the monitoring is made (step 1760).

Figure 18:
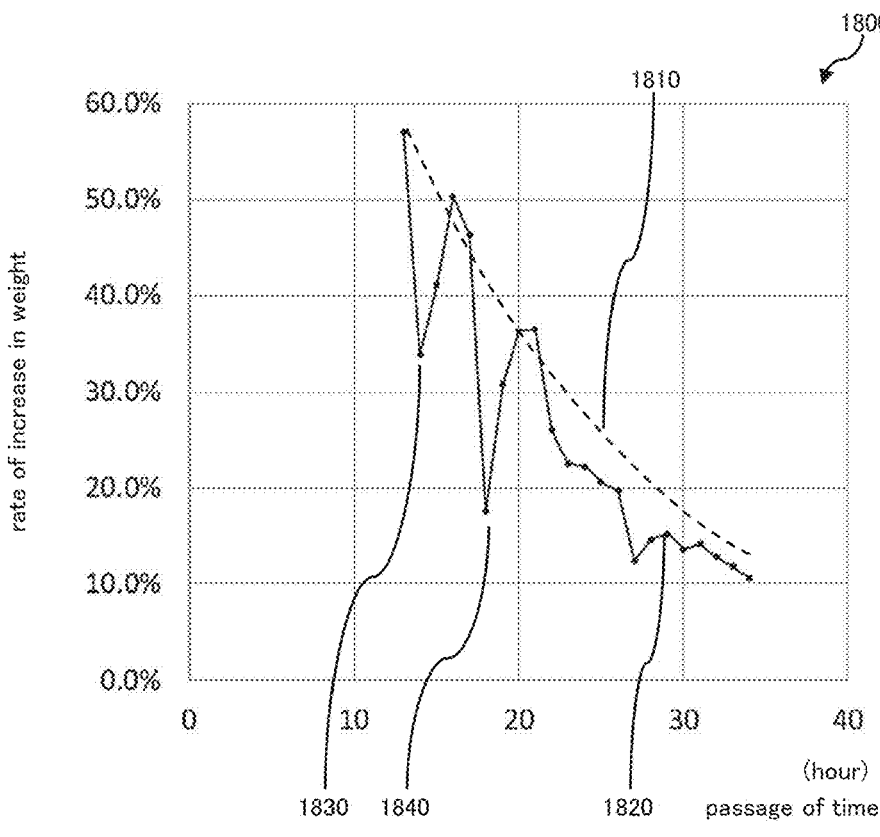
FIG. 18 is an example of a display screen regarding to a growing condition to be shown.

FIG. 18 depicts an example of a display screen of the monitored growing condition.

The growing condition monitoring module 914 displays the actual growing condition of the plant which is acquired from a plurality of sensors, on a monitor such as the output device 905 of the management terminal 810 or on a screen of the work terminal 830.

As the items to be displayed, information such as a photosynthesis rate, an evaporation rate, a water absorption rate, an area of leaves, a height of leaves, a number of leaves, a weight of strains, an abnormal growth, a number of bacteria, or the like described in the index value alert data 1240 of the basic recipe 1200 may be tracked and displayed. In the example illustrated in FIG. 18, a rate of increase in weight is shown by measuring the strain weight of the plant to be cultivated.

The portion indicated by the broken line corresponds to the assumed growing condition 1810 when the plant is assumed to be cultivated according to the environmental value data 1230. Also, the portion indicated by the solid line corresponds to the actual growing condition 1820.

In this way, the growing condition monitoring module 914 is able to display the assumed growing condition and the actual growing condition in such a manner that the conditions can be compared.

The parts shown by the reference numbers 1830 and 1840 correspond to parts where transplantations have been performed. It can be seen that, in the case of making the transplantation, taking out the plant from the closed or semi-closed cultivation device 1A may change the cultivation environment even if it is performed in a short time, resulting in a significant delay in the growth rate of the plant.

The growing condition monitoring module 914 may display an alert when a deviation of a predetermined value (for example, 5% or more) occurs between the assumed growing condition 1810 such as 1830 or 1840 and the actual growing condition 1820.

Or, it is possible to change the work recipe 1300 to be applied. For example, it may be changed to the environmental value data 1230 for promoting the delayed growth.

The cultivation device 1A of the embodiment is configured as the closed or semi-closed type cultivation device. Therefore, by making different the inside from the normal outside air environment, for example, by setting a photon flux density higher than normal, by setting a cultivation temperature higher than normal, and/or by setting a carbon dioxide concentration higher than a working environment for a person, it becomes possible to set the environment for cultivating a plant with high productivity compared to a plant cultivation method with a conventional plant factory. In the work process, a significant delay may be caused in the cultivation of the plant by taking out the plant from such a special cultivation environment to perform the work process such as the transplantation under the normal outside air environment.

Hence, according to the embodiment, the constraint condition such as the work environment 1310 and/or the work constraint condition 1320 or the like may be set even for the work process which can be conducted outside the cultivation device 1A in order to maintain the work environment within a certain environmental quality not to be deviated largely from the inside of the cultivation device 1A. As a result, by performing the environmental control and the process control of the whole plant cultivation process, it becomes possible to enhance the speed and the quality for cultivating the plant.

In a third embodiment, the cultivation device 1A is arranged in a closed or semi-closed cultivation facility 1. In this configuration, an external environment of the cultivation device 1A is managed together.

Figure 19:
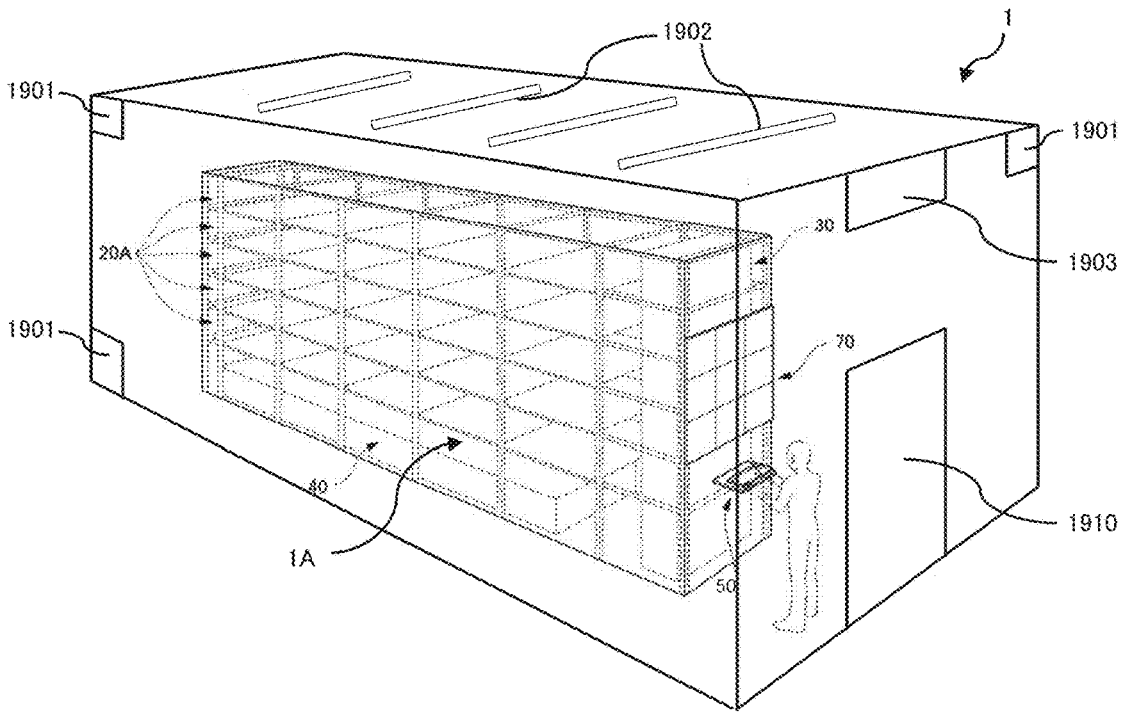
FIG. 19 is an example of a cultivation facility for controlling the environment at the inside and the outside of the cultivation device 1A.

FIG. 19 depicts an example of the cultivation facility for controlling both the inside and the outside of the cultivation device 1A.

The cultivation facility 1 is configured as a structure capable of sealing or semi-sealing the inside from the outside of the facility. The cultivation facility 1 is provided with the cultivation device 1A which is described in the first embodiment and/or the second embodiment inside. The cultivation facility 1 is configured to manage light, air, water, and space outside the cultivation device 1A.

The cultivation facility 1 constitutes a part of the plant cultivation system 800, and is connected to the management terminal 810, the management server 820, the work terminal 830, and the cultivation device 1A via a network.

The cultivation facility 1 includes a plurality of sensors 1901 for monitoring various conditions such as light, air, water, and space. In addition, the cultivation facility 1 includes an air circulation device 1903 and an artificial light source 1902 or the like for controlling the external environment outside the cultivation device 1A. The external environment may have various conditions such as light, air, water, and space.

The air circulation device 1903 has a function similar to that of the air circulation device 30 provided in the cultivation device 1A, that is, a function of adjusting at least a temperature, a humidity, a carbon dioxide concentration, and flow rate (or an amount of flow) of air.

The artificial light source 1902 has a function similar to that of the artificial light source 230 provided in the cultivation device 1A, that is, a function of dimming with light of any brightness and/or wavelength.

The cultivation facility 1 is configured to adjust and manage an environment in the cultivation facility 1 (and outside the cultivation device 1A) such as light, air, water, and space according to the basic recipe 1200 described in the second embodiment. The basic recipe 1200 sent from the management server 820 is received by the management terminal 810 and the basic recipe 1200 is stored in the basic recipe DB 921.

The environment controlling module 912 of the management terminal 810 reads the basic recipe 1200 stored in the basic recipe DB 921. Then, the environment controlling module 912 controls the air circulation device, the artificial light source, the robot manipulator, the conveyor or the like in the cultivation facility 1 according to the read information in order to control a light wavelength, a photon flux density, a temperature, a humidity, a carbon dioxide concentration, various ion concentrations, a horizontal air flow rate, an air flow rate from above, or the like in the cultivation facility 1.

It is possible to use the management server 820 instead of the management terminal 810 in order to operates the cultivation facility 1.

In this way, it is possible to control various environments such as light, air, water and space inside of the cultivation device 1A and those inside the cultivation facility 1 (that is, outside the cultivation device 1A) according to the basic recipe 1200 received from the management server 820.

The basic recipe 1200 applied to the cultivation device 1A defines a constraint condition as an acceptable variation range from the environment in the cultivation device which is controlled according to the environmental value data 1230. In addition, the basic recipe 1200 applied to the cultivation facility 1 defines a constraint condition as an acceptable variation range from the environment in the cultivation facility 1 (that is, outside the cultivation device) which is controlled according to the environmental value data 1230.

In the inside and outside of the cultivation device 1A, the environment may be changed due to a growth and movement of a plant to be cultivated and also operations for cultivating a plant, etc. The environment is managed in order to satisfy the constraint condition.

The environment controlling module 912 is able to detect that the environment exceeds the allowable variation range of the environment value which is determined as the constraint condition inside or outside of the cultivation device 1A, based on information received from various sensors. In such a case, the environment controlling module 912 may output an alert to the management terminal 810 and/or the management server 820. In addition, the environment controlling module 912 may control the air circulation device, the nourishing solution circulation device 40, the artificial light source, the robot manipulator, the conveyor or the like in order to adjust the environment of the inside or outside of the cultivation device 1A. As a result, it becomes possible to bring the environment within the constraint condition.

Next, the environmental value data 1230 to be set to the inside part and outside part of the cultivation device 1A will be described.

Basically, a person who performs a work (that is, worker) will not enter in the closed or semi-closed type cultivation device 1A. Therefore, the environment in the plant cultivation device managed by the basic recipe is set to correspond to a plant to be cultivated.

However, in a case of the inside of the cultivation facility 1 and the outside of the cultivation device 1A, there is a possibility that a worker stays there to perform a work for a plant to be cultivated. In such a case, the environment outside the plant cultivation device managed by the basic recipe is set to correspond to a person who performs a work.

It is possible to set the environment in the cultivation device 1A out of the scope permitted to a person who performs a work. For example, the outside of the cultivation device 1A may be set to an environment in which a carbon dioxide concentration is set not higher than 1000 ppm which is defined by the standards of the environmental hygiene management for the air environment. In addition, the inside of the cultivation device 1A is set to an environment in which a carbon dioxide concentration is set higher than this standard value. As a result, it becomes possible to acquire an environment for cultivating a plant with higher productivity than ever, comparing to a case in which a plant is cultivated with a conventional plant factory.

When a work process is performed according to the second embodiment, there is a possibility that a plant to be cultivated is outputted from the cultivation device 1A. In such a case, the plant to be cultivated may be placed in the environment that is largely different from the environment in the cultivation device 1A even if the period is short.

As described with reference to FIG. 18, the change in the cultivation environment even in a short period of time may result in a significant delay in the growth rate of the plant.

Therefore, in the present embodiment, the environment outside the cultivation device 1A is managed together, so that the variation of the cultivation environment for the plant is suppressed as much as possible to maintain the growth rate.

For example, when there is no worker in the environment outside the cultivation device 1A, the environment is determined only by the appropriate environment value for the plant to be cultivated. Specifically, the environment is set equivalent to or close to the inside of the cultivation device 1A.

Or, in a case that the plant to be cultivated does not exist outside the cultivation device 1A, the environment is determined only by the appropriate environment value for a worker. For example, the environment is set to be suitable for a worker, such as within a range of content ratio of carbon dioxide of 1000 ppm or below, a temperature range from 17 degrees or more to 28 degrees or below, and a relative humidity range from 40% or more to 70% or below, etc.

In addition, in a case that a worker coexists with a plant to be cultivated, the value may be set to a value between an optimal value of the environment for the plant to be cultivated and an optimal value of the environment for the worker. In other words, the environment in the cultivation facility 1 (and the environment outside the cultivation device 1A) is set according to an environmental value data which is calculated from both the basic recipe for defining the environment inside the cultivation device 1A and the basic recipe of the cultivation facility 1 for defining the environment outside the cultivation device 1A.

For example, the environment outside the cultivation device 1A is set according to the constraint condition of the basic recipe for the cultivation device 1A and the constraint condition of the basic recipe for the cultivation facility 1. Specifically, the environmental setting value is calculated for minimizing a sum of a deviation from the environmental allowable range for the plant to be cultivated defined by the basic recipe for the cultivation device 1A to the set environmental value and a deviation from the environmental allowable range for the worker defined by the basic recipe for the cultivation facility 1 to the set environmental value.

Here, it is thought that a plurality of items or values may coexist in the appropriate values of the environment for the plant to be cultivated.

In addition, it is conceivable to adapt a method to add a significance factor to the plant to be calculated and/or the worker and to calculate the environmental setting value so as to minimize a sum of the above-mentioned deviation and the significance.

The present invention is not limited to the above-described embodiments. Further, various modifications may be included in the present invention. For example, the above-described embodiments are explained in detail in order to illustrate the present invention properly. Please notice that, the above-mentioned embodiments are not necessarily limited to the examples which comprise all the described configurations. It is possible to replace a part of a configuration of one embodiment with a part of a configuration of another embodiment. It is also possible to add a part of a configuration of another embodiment to a configuration of one embodiment. Furthermore, it is also possible to modify a configuration of one embodiment by adding, deleting, or replacing a part of a configuration of another embodiment.

In addition, some or all of the above-described configurations, functions, processing units, processing means, and the like may be realized by hardware, for example, by designing them with an integrated circuit. In addition, the above-described configurations, functions, and the like may be implemented by software by interpreting and executing a program by the processor which is configured to realize respective functions. Information such as programs, tables, and files that realize various functions may be stored in a recording device such as a memory, a hard disk or an SSD (Solid State Drive), etc., or in a recording medium such as an IC card, a SD card, or a DVD, etc.

In addition, the control lines and the information lines considered to be necessary for explanation are indicated. Please notice that all the control lines and the information lines are not necessarily shown for the product. In practice, almost all of the configurations may be considered to be interconnected with each other.

The above-described embodiments disclose at least configurations described in the claims.

EXPLANATION OF REFERENCE NUMERALS

1 . . . . Plant cultivation system,
800, 810 . . . . Management terminal,
820 . . . . Management server,
830 . . . . Work terminal,
911 . . . . Recipe registration controlling module,
912 . . . . Environment controlling module,
913 . . . . Process controlling module,
914 . . . . Growing condition monitoring module,
915 . . . . Cryptographic processing module,
921 . . . . Basic recipe DB, 922 . . . . Work recipe DB While certain representative embodiments and details have been shown for purposes of illustrating the invention, it will be apparent to those skilled in the art that various changes may be made without departing from the scope of the disclosure, which is further described in the following appended claims.

We claim:
1. A plant cultivation device, comprising:
a plurality of sensors for monitoring a growing condition of a plant to be cultivated;
an environment controlling unit for controlling an environment, wherein the environment is a condition of at least one of light, air, water, and space in the plant cultivation device; and a process controlling unit for controlling a work process for cultivating the plant,
wherein the environment controlling unit is configured to control the environment in the plant cultivation device according to a basic recipe for defining environmental value information inside the plant cultivation device, wherein the environmental value information relates to a condition of at least one of light, air, water, and space for use in cultivating the plant,
wherein the process controlling unit controls the work process, which is performed outside the plant cultivation device, the work process being at least one of sowing, transplanting, harvesting, trimming, packaging, storing, and transporting related to cultivating the plant, according to a work recipe for defining the work process and work environment outside the plant cultivation device for cultivating the plant, wherein the work environment defines a condition of at least one of light, air, water, and space for outside the plant cultivation device for each of work processes to be performed outside the plant cultivation device,
wherein the work process is defined to be performed according to at least one of an elapsed time from a predetermined start time, a condition of the plant cultivation device, and a change in the environment.

2. The plant cultivation device as recited in claim 1, wherein a plurality of basic recipes defined for respective plants to be cultivated are stored in a separate management server, and wherein the environment controlling unit controls the environment in the plant cultivation device according to the basic recipe received from the separate management server, corresponding to the plant to be cultivated.

3. The plant cultivation device as recited in claim 1, wherein a plurality of work recipes defined for respective plants to be cultivated are stored in a separate management server, and wherein the process controlling unit controls the work process for cultivating the plant, according to the work recipe received from the separate management server, corresponding to the plant to be cultivated.

4. The plant cultivation device as recited in claim 3, wherein the predetermined start time is either a start time for cultivating the plant or a sowing time for the plant.

5. The plant cultivation device as recited in claim 1, wherein the work recipe defines, for each of work process to be performed, a constraint condition for a work environment to be satisfied.

6. The plant cultivation device as recited in claim 5, wherein the constraint condition for the work environment is an allowable variation range from the environment in the plant cultivation device which is controlled according to environment value information of the basic recipe.

7. The plant cultivation device as recited in claim 6, wherein the environmental value information relates to a temperature, and the constraint condition for the work environment relates to an allowable variation range of a temperature from a temperature in the plant cultivation device which is controlled according to the environmental value information.

8. The plant cultivation device as recited in claim 6, wherein the environmental value information relates to a humidity, and the constraint condition for the work environment relates to an allowable variation range of a humidity from a humidity in the plant cultivation device which is controlled according to the environmental value information.

9. The plant cultivation device as recited in claim 6, wherein the environmental value information relates to a carbon dioxide concentration, and the constraint condition for the work environment relates to an allowable variation range of a carbon dioxide concentration from a carbon dioxide concentration in the plant cultivation device which is controlled according to the environmental value information.

10. The plant cultivation device as recited in claim 5, wherein the process controlling unit displays the constraint condition for the work environment to be satisfied when the work process is performed, together with the work process defined in the work recipe.

11. The plant cultivation device as recited in claim 5, wherein the process controlling unit displays an alert when the constraint condition for the work environment to be satisfied in executing the work process is not satisfied.

12. The plant cultivation device as recited in claim 1, wherein the plant cultivation device has a cultivation facility, which is provided with the plant cultivation device inside, the cultivation facility manages the work environment in an external work space which is outside the plant cultivation device and inside of the cultivation facility, wherein the basic recipe defines environmental value information for the inside of the plant cultivation device, and wherein the work recipe defines the work environment in the external work space outside the plant cultivation device and inside of the cultivation facility to be satisfied for a case that the plant to be cultivated is taken out from the plant cultivation device to the external work space outside the plant cultivation device and inside of the cultivation facility.

13. The plant cultivation device as recited in claim 1, wherein the plant cultivation device includes a growing condition monitoring unit for displaying the growing condition of the plant to be cultivated.

14. A non-transitory computer readable recording medium storing program for causing a plant cultivation device, wherein the plant cultivation device being configured to acquire information from a plurality of sensors for monitoring a growing condition of a plant to be cultivated, to function as:

an environment management unit managing the environment which is at least one of the conditions of light, air, water, and space in the plant cultivation device, and a process control unit managing working process of cultivating the plant wherein the environment management unit manages the environment in the plant cultivation device according to a basic recipe for defining environmental value information inside the plant cultivation device, wherein the environmental value information relates to a condition of at least one of light, air, water, and space for use in cultivating the plant, wherein the process control unit controls the work process, which is performed outside the plant cultivation device, the work process being at least one of sowing, transplanting, harvesting, trimming, packaging, storing, and transporting related to cultivating the plant, according to a work recipe for defining the work process and work environment outside the plant cultivation device for cultivating the plant wherein the work environment defines a condition of at least one of light, air, water, and space for outside the plant cultivation device for each of work processes to be performed outside the plant cultivation device, wherein the work process is defined to be performed according to at least one of an elapsed time from a predetermined start time, a condition of the plant cultivation device, and a change in the environment.

15. A method for cultivating a plant in a plant cultivation device, comprising the steps of:

acquiring information from a plurality of sensors for monitoring a growing condition of a plant to be cultivated;

controlling an environment in the plant cultivation device according to a basic recipe for defining environmental value information inside the plant cultivation device, wherein the environment is a condition of at least one of light, air, water, and space in the plant cultivation device, wherein the environmental value information relates to a condition of at least one of light, air, water, and space for use in cultivating the plant;

controlling a work process, which is performed outside the plant cultivation device, the work process being at least one of sowing, transplanting, harvesting, trimming, packaging, storing, and transporting related to cultivating the plant, according to a work recipe for defining the work process and work environment outside the plant cultivation device for cultivating the plant, wherein the work environment defines a condition of at least one of light, air, water, and space for outside the plant cultivation device for each of work processes to be performed outside the plant cultivation device, wherein the work process is defined to be performed according to at least one of an elapsed time from a predetermined start time, a condition of the plant cultivation device, and a change in the environment.

16. The method for cultivating the plant as recited in claim 15, wherein the environment in the plant cultivation device is controlled according to a basic recipe for defining environmental value information, wherein the environmental value information relates to a condition of at least one of light, air, water, and space to be applied for cultivating the plant.

17. The method for cultivating the plant as recited in claim 15, wherein the work process for cultivating the plant is controlled according to a work recipe for defining the work process for cultivating the plant, wherein the work process is defined to be performed according to at least one of an elapsed time from a predetermined start time, a condition of the plant cultivation device, and a change in the environment.

18. A plant produced by a method for cultivating a plant in a plant cultivation device, wherein the method for cultivating the plant comprises the steps of:

acquiring information from a plurality of sensors for monitoring a growing condition of the plant to be cultivated;

controlling an environment in the plant cultivation device according to a basic recipe for defining environmental value information inside the plant cultivation device, wherein the environment is a condition of at least one of light, air, water, and space in the plant cultivation device, wherein the environmental value information relates to a condition of at least one of light, air, water, and space for use in cultivating the plant; and controlling a work process, which is performed outside the plant cultivation device, the work process being at least one of sowing, transplanting, harvesting, trimming, packaging, storing, and transporting related to cultivating the plant, according to a work recipe for defining the work process and work environment outside the plant cultivation device for cultivating the plant, wherein the work environment defines a condition of at least one of light, air, water, and space for outside the plant cultivation device for each of work processes to be performed outside the plant cultivation device, wherein the work process is defined to be performed according to at least one of an elapsed time from a predetermined start time, a condition of the plant cultivation device, and a change in the environment.

19. The plant cultivation device as recited in claim 12, wherein the cultivation facility controls the work environment which is at least one of a light wavelength, a photon flux density, a temperature, a humidity, a carbon dioxide concentration, ion concentrations, an air flow in the external work space outside the plant cultivation device and inside of the cultivation facility.

\* \* \* \* \*